(12) United States Patent
Poustchi et al.

(10) Patent No.: US 7,940,781 B2
(45) Date of Patent: May 10, 2011

(54) PAGING BETWEEN NETWORK DEVICES

(75) Inventors: Behrouz Poustchi, Ottawa (CA); Jennifer Bell, Ottawa (CA); James Andrew Stelzig, Gatineau (CA)

(73) Assignee: Avaya Canada Corp., Halifax (CA)

( * ) Notice: Subject to any disclaimer, the term of this patent is extended or adjusted under 35 U.S.C. 154(b) by 1930 days.

(21) Appl. No.: 10/995,100

(22) Filed: Nov. 24, 2004

(65) Prior Publication Data

US 2005/0135349 A1    Jun. 23, 2005

Related U.S. Application Data

(60) Provisional application No. 60/524,041, filed on Nov. 24, 2003.

(51) Int. Cl.
*H04L 12/56* (2006.01)
*H04L 12/13* (2006.01)

(52) U.S. Cl. .......................... 370/401; 370/270

(58) Field of Classification Search .................. 370/270, 370/312, 338, 352, 356, 401, 466, 384, 400; 455/422.1, 426, 1
See application file for complete search history.

(56) References Cited

U.S. PATENT DOCUMENTS

| | | | |
|---|---|---|---|
| 5,526,398 A * | 6/1996 | Okada et al. | 455/426.1 |
| 5,544,235 A * | 8/1996 | Ardon | 379/177 |
| 5,740,235 A | 4/1998 | Lester et al. | |
| 6,058,305 A * | 5/2000 | Chavez, Jr. | 455/426.1 |
| 6,097,968 A * | 8/2000 | Bannister et al. | 455/561 |
| 6,434,383 B1 * | 8/2002 | Bruno et al. | 455/426.1 |
| 6,529,500 B1 | 3/2003 | Pandharipande | |
| 6,542,517 B1 * | 4/2003 | Giacalone | 370/465 |
| 6,563,910 B2 | 5/2003 | Menard et al. | |
| 6,680,920 B1 * | 1/2004 | Wan | 370/311 |
| 6,687,243 B1 | 2/2004 | Sayers et al. | |
| 6,717,938 B1 | 4/2004 | D'Angelo | |

(Continued)

FOREIGN PATENT DOCUMENTS

EP    1197178 A1    8/2001
(Continued)

OTHER PUBLICATIONS

VOIP, Cicsco 7940-7960 auto-answer config, 2002, Tiki v1.8.2, (CVS), http://voip-info.org/tiki-index.php?page=Cisco%207940-7960%20auto-answer%20config.

(Continued)

*Primary Examiner* — Pankaj Kumar
*Assistant Examiner* — Saba Tsegaye
(74) *Attorney, Agent, or Firm* — Muncy, Geissler, Olds & Lowe, PLLC

(57) ABSTRACT

A network device such as a terminal set in a distributed peer-to-peer communications network receives periodic notifications from other network devices indicating which network devices are currently receiving pages. When the network device wishes to send a page to a set of target network devices, it ascertains whether the target devices are already receiving a page. If not, the network device notifies other network devices that it is claiming the target devices for its exclusive paging use. Each device receiving the notification ascertains whether it is one of the target devices, and if so, prepares to receive a page. Absent any objections, the initiating device sends the page (e.g. audio or video) to the target devices. Upon completion, the network device relinquishes its claim to the target devices. If a target network device becomes engaged in a call while receiving a page, playing of the page may be ceased.

63 Claims, 15 Drawing Sheets

U.S. PATENT DOCUMENTS

| | | | |
|---|---|---|---|
| 6,738,803 B1 | 5/2004 | Dodrill et al. | |
| 6,754,224 B1 | 6/2004 | Murphy | |
| 6,754,335 B1 | 6/2004 | Shaffer et al. | |
| 7,092,376 B2 * | 8/2006 | Schuman | 370/349 |
| 7,092,386 B2 | 8/2006 | Wynn | |
| 2002/0173326 A1 * | 11/2002 | Rosen et al. | 455/518 |
| 2002/0181442 A1 * | 12/2002 | Rajani | 370/352 |
| 2003/0023741 A1 * | 1/2003 | Tomassetti et al. | 709/231 |
| 2003/0112930 A1 | 6/2003 | Bosik et al. | |
| 2004/0125776 A1 * | 7/2004 | Haugli et al. | 370/338 |
| 2004/0127233 A1 * | 7/2004 | Harris et al. | 455/458 |
| 2004/0176112 A1 * | 9/2004 | Beckmann et al. | 455/458 |
| 2006/0079262 A1 * | 4/2006 | Harris et al. | 455/520 |

FOREIGN PATENT DOCUMENTS

| | | |
|---|---|---|
| WO | WO 97/38518 * | 10/1997 |
| WO | WO 98/23080 | 5/1998 |
| WO | WO 02/052786 A2 | 7/2002 |
| WO | WO 2004/019599 A1 | 3/2004 |

OTHER PUBLICATIONS

Cisco Systems, Cisco 7900 IP Phone 7902G for Cisco CallManager Express, 2004, Chapter 5, http://www.cisco.com/en/US/products/hw/phones/ps379/products_user_guide_chapter09186a00801aea8c.html.

Cisco Systems, Cisco CallManager Version 4.0, 2004, http://www.cisco.com/en/US/products/sw/voicesw/ps556/products_data_sheet09186a00801f8e2e.html.

John Baker, Polycom Paging & Intercom—Please Wiki-Size, 2004, http://lists.digium.com/pipermail/asterisk-users/2004-March/040186.html.

Wave, Twisted Pair Solutions, 2004, http://www.twistpair.com/products/wave/faq.asp.

Bogen Communications, Inc., Page Overhead to Multiple Offices Simultaneously with Voip, 2004. U.S.A.

Valcom IP Solutions, VIP-800 Networked Paging Zone Extender, Issue 2, pp. 1-7.

Valcom IP Solutions, VIP-800 Networked Audio Port, 2004, http://voip.valcom.com/vip800.htm.

* cited by examiner

292 ➔

292 ➔

PAGING BETWEEN NETWORK DEVICES

CROSS REFERENCE TO RELATED APPLICATIONS

The present application claims the benefit of prior provisional application Ser. No. 60/524,041 filed Nov. 24, 2003, the contents of which are hereby incorporated by reference hereinto.

FIELD OF THE INVENTION

The invention relates to paging between network devices, such as paging between peers in a distributed peer-to-peer communications network for example.

BACKGROUND OF THE INVENTION

In many known circuit-switched or packet-switched telephony solutions, a centralized piece of equipment (e.g. a switch or Private Branch Exchange (PBX)) provides call termination, call processing, switching and/or call handling capabilities. In large systems, the central equipment may be a powerful computer controlling a number of functions on circuit boards called line cards, which connect telephone sets to the computer. In small systems (e.g. in systems having ten or fewer terminal sets), the central intelligence may actually reside in a "golden" telephone set that is specially designed to hold the central processing equipment.

Regardless of the form the central equipment takes, a number of terminal sets (e.g. wired or wireless telephone sets) are usually connected to the central equipment. The terminal sets are typically "dumb" devices in comparison to the central equipment. That is, terminal sets may simply send hookswitch information and key presses (e.g. Dual Tone Multi-Frequency or DTMF tones) to the central equipment and convert signals from the central equipment such as a dial-tone, ringing tone, or voice signals into sound (or, in some cases, images or video). The terminal sets are typically unaware of the existence of any other terminal sets, and have no inherent capacity to interconnect themselves with another terminal set.

In centralized telephony systems, administration and discovery of telephone sets within a network is typically performed by the central equipment. For example, in a traditional circuit-switched Time Division Multiplexing (TDM) telephony system, for example, each terminal set may be connected to a port on the central call processing equipment. Typically, as part of an initialization sequence which occurs on power-up, each terminal set announces its availability to the central equipment. The central equipment monitors each port for such announcements as new terminal sets are connected, and is thus capable of "discovering" newly-added terminal sets.

In centralized Voice-over Internet Protocol (IP) or VoIP telephony systems, a very similar but slightly more complicated procedure is employed; however, a terminal set still announces its availability to the central call processing equipment via the network. As is known in the art, VoIP is the transmission of calls over a data network based on the IP. Communication takes the form of packet data, thus there is no fixed connection as in the case of circuit-switched networks. The communication can be text, voice, graphics or video. IP equipment may adhere to such standards as H.323 and Session Initiation Protocol (SIP) for interoperability. The H.323 standard generally describes how multimedia communication is to occur between terminals, network equipment and services. The SIP standard covers the technical requirements to set up, modify and tear down multimedia sessions over the Internet. As used herein, the term "call" refers to a multimedia communication between two endpoints, and includes a voice telephone call.

Regardless of whether central equipment is circuit switched or packet switched, during the course of discovering a new terminal set the central equipment will usually automatically assign and manage a Directory Number (DN), which is a form of network address. The DN may be, e.g., a PBX extension. As DNs are assigned to different sets, the DNs are added to a list of DNs maintained at the central equipment. Often, it is only on the basis of this centralized list that the centralized equipment is able to determine the identity of the physical terminal set that should be called when a DN is forwarded from a calling terminal set.

In centralized systems, information used for paging is also typically stored centrally. For example, a user at a terminal set may instruct the central processing equipment to create and open a paging channel for a specified "paging zone" (e.g. a set of terminal sets in a common physical area, such as a floor or department). The central processing equipment may then identify the terminal sets in the specified zone using information maintained at the central equipment and sends messages or other signals to each individual terminal set in the zone to effect transmission of voice data to terminal set speakers, for example.

As the costs associated with greater processing capacity and memory continue to decrease, the inclusion of a call-processing engine in every telephone set connected to a network is becoming feasible. In such systems, it may be desirable to eliminate the central equipment. Such a decentralized system may be referred to as a distributed telephony system.

In a distributed telephony system, storage of paging information at central equipment is not possible because no central equipment exists. It would nevertheless be desirable for paging to be provided in distributed peer-to-peer networks.

More generally, it would be desirable for paging to be provided in any decentralized network.

SUMMARY OF THE INVENTION

A network device such as a terminal set in a distributed peer-to-peer communications network receives periodic notifications from other network devices indicating which network devices are currently receiving pages. When the network device wishes to send a page to a set of target network devices, it ascertains whether the target devices are already receiving a page. If not, the network device notifies other network devices that it is claiming the target devices for its exclusive paging use. Each device receiving the notification ascertains whether it is one of the target devices, and if so, prepares to receive a page. Absent any objections, the initiating device sends the page (e.g. audio or video) to the target devices. Upon completion, the network device relinquishes its claim to the target devices. If a target network device becomes engaged in a call while receiving a page, playing of the page may be ceased.

In accordance with an aspect of the present invention there is provided at a network device, a method comprising: receiving at least one indication of a page to be sent to a set of recipient network devices including one or more network devices, the at least one indication indicating the set of recipient network devices; ascertaining whether the network device is within said set of recipient network devices; and based at least upon the ascertaining, determining whether to receive the page.

In accordance with another aspect of the present invention there is provided a network device adapted to: receive at least one indication of a page to be sent to a set of recipient network devices including one or more network devices, the at least one indication indicating the set of recipient network devices; ascertain whether the network device is within the set of recipient network devices; and based at least upon the ascertaining, determine whether to receive the page.

In accordance with yet another aspect of the present invention there is provided a machine-readable medium including machine-executable code for execution at a network device, comprising: machine-executable code for receiving at least one indication of a page to be sent to a set of recipient network devices including one or more network devices, said at least one indication indicating said set of recipient network devices; machine-executable code for ascertaining whether said network device is within said set of recipient network devices; and machine-executable code for, based at least upon said ascertaining, determining whether to receive said page.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION

Figure 1:
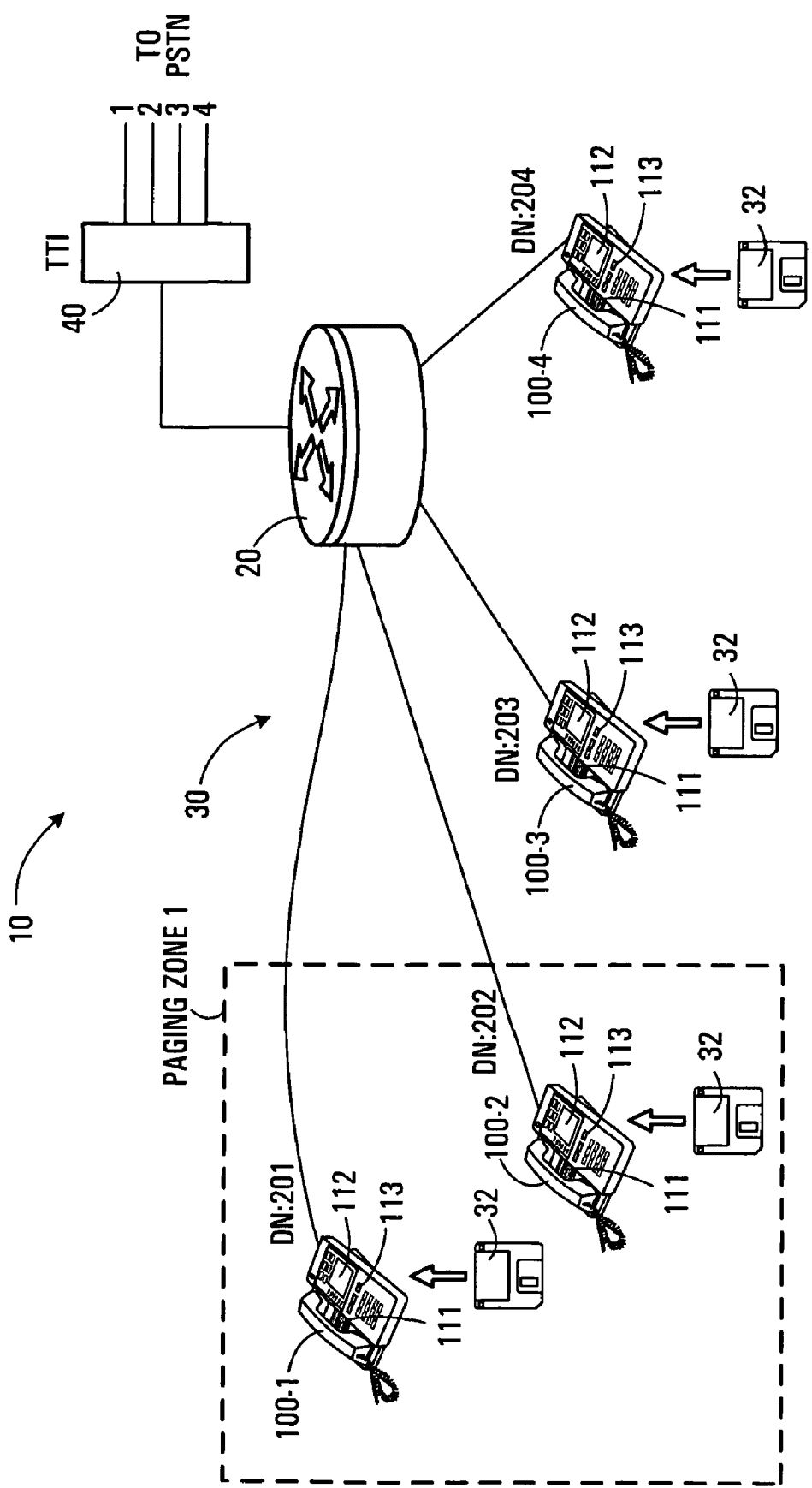
FIG. 1 is a telephone system comprising a distributed peer-to-peer communications network including multiple networked terminal sets capable of paging operation according to an embodiment of the invention.

Paging capabilities may be provided (but are not necessarily provided) in conjunction with peer discovery capabilities which permit the network device to recognize, and be recognized by, other network devices (peers) in a peer-to-peer network. An overview of peer discovery operation in an exemplary embodiment follows. This overview provides a context for the subsequent description of paging operation in this embodiment.

Peer Discovery

In an exemplary distributed telephony system lacking a central piece of routing or switching equipment, certain features may be desirable. One desirable feature may be a capability of automatically assigning a unique DN to each terminal set upon initial connection of the terminal set (e.g. a telephone set, Portable Digital Assistant (PDA), Personal Computer (PC), wireless terminal, Think Trunk Interface (TTI), or other network device) to a network, preferably with an effort being made to minimize conflict between the DNs chosen by different terminal sets in the network. Another desirable or mandatory feature is to ensure that each terminal set is made aware of the DN of every other terminal set connected to the network, so that each terminal set is capable of making calls to other terminal sets. A further desirable feature is the capability of preserving a DN assigned to a terminal set even upon disconnection of the terminal set from the network or upon loss of power of the terminal set (either of these resulting in a terminal set becoming "inactive"). The motivation for preserving the DN may be to prevent the DN of the inactive terminal set from being reassigned as a result of temporary disconnection of the terminal set from the network (due to, e.g., a faulty connection between the terminal set and the network, a simple loss of power, or a wireless terminal set moving out of range), which reassignment could result in confusion on the part of a calling party as which terminal set has been called.

To support these features, a terminal set exemplary of an embodiment of the present invention, upon initial connection to a network in a "factory fresh" (i.e. as yet unconfigured) state, notifies the other terminal sets on the network (its "peers") of its connection the network by way of a network connection notification. The network connection notification includes a unique identifier associated with the terminal set, such as a Media Access Control (MAC) address for example. As is known in the art, a MAC address is a unique hardware address or hardware number which serves as a unique identifier for a network device. The network connection notification may take the form of an I_AM_HERE message which is sent multiple times in order to increase the likelihood that the message will be received (at least in the case where no acknowledgement is sent by the other peers for each received message, as in the present embodiment).

The newly-connected terminal set also receives existence notifications from other terminal sets. An existence notification is an indication of a the existence a terminal set which either currently has a presence on the network (i.e. is active and connected to the network) or previously had a presence on the network (i.e. was previously active and connected but has now become disconnected and inactive). In the present embodiment, an existence notification may be any of an I_AM_HERE message (previously described), a PEER_ASSERT message (described below), or an INACTIVE_

PEER_ASSERT message (described below). Each existence notification includes the unique identifier of the terminal set in respect of which the message was sent. The latter two types of messages (PEER_ASSERT and INACTIVE_PEER_ASSERT messages) additionally provide an indication of already claimed DNs, and are only received when the newly-connected terminal set is joining a network in which at least one terminal set has already claimed a DN.

From the existence messages, a list of all of the terminal sets on the network (referred to as a routing table), is created. The terminal sets in the list are sorted by their unique network device identifiers. For any terminal sets which have already claimed DNs, the claimed DN will be indicated in the sorted list. The newly-connected terminal set will have an ordinal position within the list.

To select a prospective DN, the newly-connected terminal set may add an offset associated with its ordinal position in the list to a base DN. For example, in a system where the DN represents a PBX extension, assuming that the new terminal set is third in a list of five terminal sets, the prospective DN may be determined to be 203 (an offset equal to the terminal set's ordinal position, i.e. 3, plus a base DN of 200). By basing the selection of a prospective DN on the unique ordinal position associated with the terminal set, selection of unique prospective DNs by different-terminal sets will be promoted. This assumes a scenario in which multiple factory-fresh terminal sets simultaneously join a network having no existing terminal sets with previously assigned DNs. The rationale is to try to prevent different terminal sets from initially selecting the same prospective DN, which may result in time-consuming conflict resolution processing.

Upon selecting its prospective DN, the newly-connected terminal set will then notify each other terminal set of its prospective DN. This is referred to as a "DN Probe". If no other terminal set objects to the claiming by the newly-connected terminal set of the prospective DN (with any objection possibly being based on an existing claim to that DN by one of the other terminal sets), the newly-connected terminal set claims the prospective DN as its own. The newly-connected terminal set may allow a pre-determined time interval to elapse before claiming its prospective DN, to provide sufficient time for the other terminal sets to raise any objections. Assuming that the prospective DN has been successfully claimed, the newly-connected terminal set notifies each other terminal set of its claim to that DN. The newly-connected set also stores the claimed DN in non-volatile memory, so that the assigned DN may be recalled if the terminal set loses power. The routing table may also be stored.

In the event that the newly-connected terminal set is joining an established network, the other terminal sets on the network may already have selected their DNs. In this case, it is possible that the prospective DN chosen by the newly-connected terminal set may already be assigned to one of the existing terminal sets. For example, if the ordinal position of the newly-connected terminal set within the sorted list of terminal sets is other than at the end of the list (e.g. if the unique identifier of the new terminal set places it somewhere in the middle of the sorted list), the prospective DN that will result when the offset associated with the ordinal position of the newly-connected terminal set is added to the base DN may represent the DN of one of the existing terminal sets.

In view of this possibility, before the newly-connected telephone attempts to notify any other terminal set of its prospective DN, it first consults its routing table to determine whether the prospective DN is already claimed by any other terminal sets in the network. If the prospective DN is already claimed by another set, the newly-connected DN may select another prospective DN, e.g. by adding an offset such as 1 to the largest DN found in the list, before notifying any of the other terminal sets of its choice. This may avoid unnecessary communications overhead on the network which might otherwise result if the newly-connected terminal set notifies each other terminal set of its prospective DN only to receive an objection from one of the other terminal sets which has already claimed that DN.

Once a newly-connected terminal set has successfully claimed a DN, the terminal set periodically notifies the other terminal sets on the network of its claim to that DN. In the present embodiment, each periodic notification takes the form of a PEER_ASSERT message which serves as a "heartbeat" of the newly-connected terminal set, indicating continued network presence and a continued claim to its DN. The notifications are monitored by the other terminal sets on the network. In the present embodiment, the periodic notifications occurs at random time intervals (e.g. between 0 and 2 seconds). If a predetermined amount of time elapses without receipt of a notification from a terminal set, that terminal set is presumed to have become inactive. The periodic notification also serves to prevent a subsequently-added terminal set from attempting to claim that DN as its own. For example, if another terminal set has selected that DN as its prospective DN and is awaiting any objection from other terminal sets, the notification may serve as an objection to the claim of that DN by that terminal set. Express objections (e.g. DN_CONFLICT messages) may also be sent.

If a terminal set that has claimed a DN disconnects from the network or loses power, it will likely be incapable of periodically notifying the other terminal sets on the network of its claim to its DN. In this case, another terminal set in the network which has become aware of the inactivity of the disconnected terminal set (e.g. by the absence of any recent PEER_ASSERT messages from that terminal set) steps in and begins periodically notifying the other terminal sets on the network of the fact that, although the disconnected terminal set is inactive, its DN has already been claimed. The terminal set which has stepped in, which is referred to as a "surrogate" for convenience, is responsible for sending these periodic notifications (which take the form of INACTIVE_PEER_ASSERT messages, described below) in addition to periodically notifying the other terminal sets of its claim to its own DN. An algorithm may be applied to decide which terminal set should be the surrogate for an inactive terminal set. The surrogate's periodic notifications sent on behalf of the inactive terminal set may prevent a subsequently-added terminal set from attempting to claim the DN of the disconnected terminal set as its own.

If the disconnected terminal set later reconnects with the network, it may resume notifying the other terminal sets of its DN (which it may recall from its non-volatile memory) on its own behalf. When the surrogate terminal set detects the reconnection, it may cease notifying the other terminal sets of the reconnected terminal set's DN, since the reconnected terminal set has reassumed this responsibility.

Referring to FIG. 1, shown is a telephony system 10 (or "telephone system 10") which is capable of performing paging according to an embodiment of the invention. The telephone system 10 has a Thin Trunk Interface (TTI) 40 and a plurality of telephone sets 100-1 through 100-T (each a form of terminal set and a form of network device) connected to a Local Area Network (LAN) 30 through a switch 20. Alternatively, the switch 20 may be replaced with a network hub or router. Only four telephone sets are shown for clarity; however, there may be a total of T telephone sets where $T \geq 2$ and furthermore, in some embodiments of the invention T is a large number, for example in the thousands. The Thin Trunk Interface 40 is, for example, a basic Analog or digital T1/E1 interface or any other Public Switched Telephone Network PSTN interface and provides a local central office or PSTN interworking interface and is coupled to a number of telephone "lines" 1, 2, 3, 4. Lines 1, 2, 3, 4 are wire pairs representative of facilities provided by a local central office or PSTN (not shown). In some embodiments of the invention, there are many lines requiring multiple Thin Trunk Interfaces. For example, if 8 lines are required to the PSTN then a second Thin Trunk Interface can be added to the system 10.

Unlike conventional centralized telephony systems, the system 10 of FIG. 1 features distributed call processing. This distributed call processing may feature a number of capabilities including distributed voice mail for example.

As illustrated in FIG. 1, each terminal set is equipped with a speaker 111, a display 112, and a page button 113. The speaker 111 is a conventional telephone set speaker which is capable of playing a calling party's voice at an appropriate volume for paging and for possible use in association with other features such as hands-free calling. The display 112 may for example be a liquid crystal display capable of displaying video content (e.g. for video paging) which may otherwise be used to present a user interface for the terminal set. The page button 113 is a convention terminal set button which is pressed by a user to indicate a desire to send a page.

As can be seen in FIG. 1, terminal sets 100-1 and 100-2 have been configured (e.g. by a system administrator, upon connection of the terminal sets 100-1 and 100-2 to the network 30) to be within paging zone 1. This may be due to a common physical location for terminal sets 100-1 and 100-2 for example. As will be described, this means that terminal sets 100-1 and 100-2 may simultaneously receive a page directed to paging zone 1.

Figure 2:
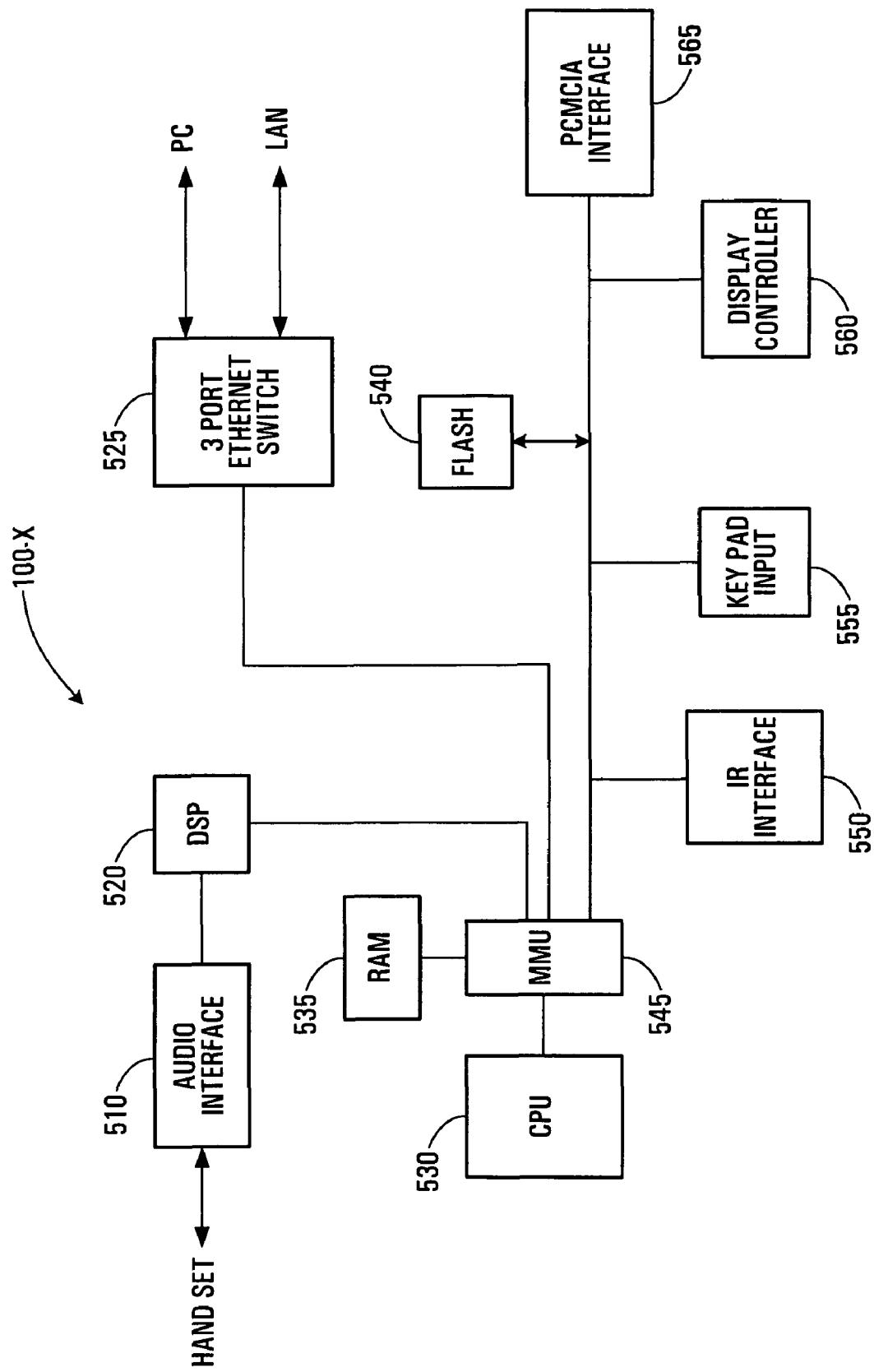
FIG. 2 is a partial circuit block diagram of an exemplary terminal set of the telephone system of FIG. 1.

Referring to FIG. 2, shown is a partial circuit block diagram of an exemplary telephone set 100-X (where X=1 to 4) of the telephone system 10 of FIG. 1. A Central Processor Unit (CPU) 530, a Memory Management Unit (MMU) 545 and a Random Access Memory (RAM) 535 provide the basis of a computational device. This computational device is connected to a Digital Signal Processor (DSP) 520 for encoding and decoding audio signals. The DSP 520 connects to an audio interface 510. The computational device is also connected to a 3-port switch 525 to allow connection to a LAN (e.g. LAN 30) and a Personal Computer (PC). The computational device is also connected to a host of peripherals such as a Flash non-volatile memory 540, an Infra Red (IR) interface 550, a Keypad and button interface 555, a Liquid Crystal Display (LCD) controller 560 (for controlling LCD 112), and a Personal Computer Memory Card International Association (PCMCIA) Interface 565 to allow for standardized expansion of the terminal set 100. While a specific architecture is shown, more generally any packet based (e.g. Internet Protocol (IP)) telephone may be used, assuming sufficient processing and memory capacity is available to implement the methods described below. For example, an off-the-shelf IP phone such as those manufactured by Mitel, Nortel Networks, Avaya, Siemens, NEC, Pingtel or 3COM could be used (e.g. Nortel i2004, Siemens optiPoint 410, or Avaya 4610).

Figure 3:
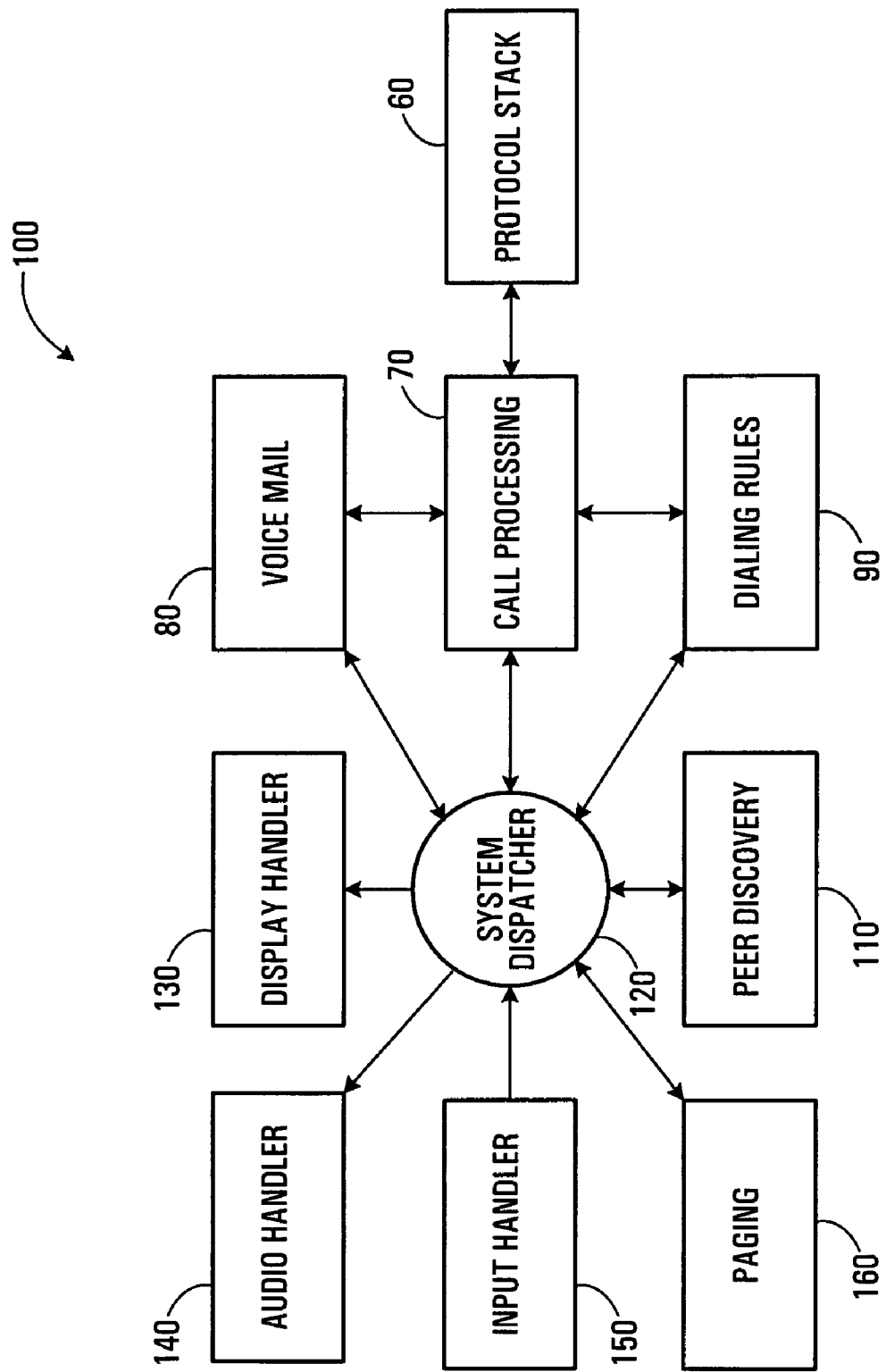
FIG. 3 is a functional block diagram of software operating on an exemplary terminal set of FIG. 1.

Referring to FIG. 3, shown is a functional block diagram of software operating on an exemplary telephone set 100-X of FIG. 1. The software is typically stored in RAM 535 of FIG. 2 and run on CPU 530, and may be loaded from a non-transitory machine-readable medium 32 which could be a magnetic or optical disk, a tape, a chip, or another form of primary or secondary storage. More generally, the software can be implemented as any suitable combination of machine-executable code stored in memory for execution by general or special purpose processors, firmware, hardware, Application Specific Integrated Circuits (ASICs), Field-Programmable Gate Arrays (FPGAs), general or special purpose logic.

A system dispatcher 120 provides communication and scheduling between various functional elements which include a protocol stack 60, a call processing module 70, a voice mail module 80, a dialing rules module 90, a peer discovery module 110, a display handler 130, an audio handler 140, an input handler 150 and a paging module 160.

Protocol stack 60 is a software implementation of a computer networking protocol (or set of protocols) that allows the terminal set to transmit and receive messages. Protocol stacks are well understood by those skilled in the art.

The call-processing module 70 interacts with a protocol stack 60 to set up and tear down a call, and set up voice channels. The call processing modules 70 of a number of sets collectively serve to deliver PBX-like call processing capabilities in a distributed fashion without the need for centralized equipment.

Voice mail module 80 provides voice mail service when a call is received and a user is unable to answer the call.

The dialing rules module 90 contains and applies a set of dialing rules for the call-processing module 70 which control how calls are made.

The peer discovery module 110 facilitates peer discovery when a terminal set 100-X is initially connected to a network, and is the focus of the present section ("PEER DISCOVERY").

The display handler 130 is responsible for formatting and displaying information to a user.

The audio handler 140 is adapted to play audio tones such as ringing, busy, call waiting tone or adapted to connect to a voice channel from the network to the handset speaker (or speaker phone) upon receipt of an audio message from the system dispatcher 120.

The input handler 150 is responsible for monitoring such functions as key press, hook switch, volume keys, hands free and mute button and for informing the system dispatcher 120 of appropriate actions to take.

The paging module 160 handles paging to and from other terminal sets. Paging module 160 will be described in the following section ("PAGING").

Figure 4:
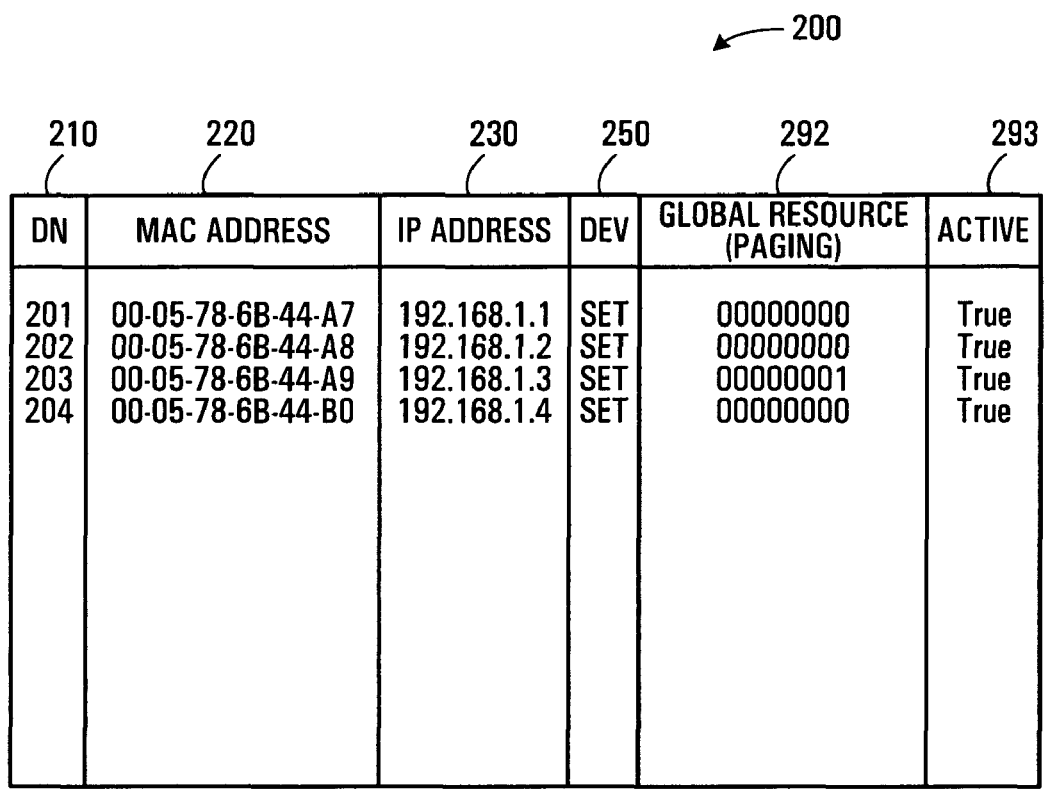
FIG. 4 is a routing table of an exemplary terminal set of FIG. 1.

FIG. 4 illustrates a routing table 200 that is created and maintained by each terminal set 100-X in the telephony system 10. The routing table represents an indication of the other terminal sets having a presence on the LAN 30 (including terminal sets which may have become inactive). As will be described, a terminal set 100-X creates routing table 200 by storing information from multiple I_AM_HERE existence messages and from other types of messages (e.g. PEER_ASSERT messages), received from other terminal sets on the network 30. In the present embodiment, routing table 200 includes an entry for the current terminal set 100-X, so that the table 200 represents a summary of all of the terminal sets associated with the network 30.

As shown in FIG. 4, the routing table 200 stores various types of information regarding each of the terminal sets having a presence on network 30, including a DN (column 210), MAC address (column 220), IP address (column 230), device type (column 250), global resource management information (column 292), and an active flag (column 293). Other information which may also be stored for each terminal set is omitted for clarity.

The DN (column 210) is a directory number, which is analogous to a PBX extension. When a DN appears in column 210 for a terminal set, that DN is understood to have been claimed by that terminal set. When a terminal set has not yet claimed a DN (e.g. if it has just announced its presence on the network 30 or has only selected a prospective DN which has not yet been decisively claimed), the column 210 will be empty for that terminal set. Although the DNs in column 210 are shown in ascending order in FIG. 4, it will be appreciated that the DNs could be in non-ascending or non-sequential order, depending upon the order in which the terminal sets are added to the network and other factors, as will become apparent.

The MAC address (column 220) is a unique hardware address or hardware number which serves as a unique identifier for each terminal set. As will be appreciated, MAC addresses may be used in the present embodiment to resolve conflicts when the same DN is selected by different terminal sets as well as paging conflict, arising when two terminal sets simultaneously wish to page the same paging zone. A MAC address will be specified in column 220 for every terminal set appearing in the routing table 200. In the routing table 200, the terminal sets are sorted in ascending MAC address order. An alternative embodiment could sort the terminal sets in descending order.

The IP address (column 240) represents the IP address assigned to each terminal set, in the case of VoIP terminal sets for example.

Device type (column 250) is an indication of the type of each network device on the network 30. In the present example, each network device is a terminal set (identified by the value "SET" in column 250). In alternative embodiments, network device may include other types of devices, such as gateways or a thin trunk interfaces for example. Peer discovery as described herein may be performed for network devices regardless of device type.

The global resource management information (column 292) is used for management of global resources. The global resource management field may have an overall length of four bytes (32 bits) for example, however only an 8-bit portion of the field used for purposes of paging is illustrated in column 292 of FIG. 4. For convenience, this 8-bit portion will be referred to as the paging field 292. Paging field 292 is an indication of whether or not the terminal set represented by the row of routing table 200 is presently paging any of the paging zones in the system 10, and if so, which paging zone is being paged. Paging field 292 is described in greater detail below in the "PAGING" section.

The active flag (column 293) is an indication of whether or not a terminal set is currently active. As previously described, terminal sets periodically send PEER_ASSERT messages to other terminal sets to inform the other terminal sets that they are still active and to provide other information. If no PEER_ASSERT message has been received by an terminal set 100-X for a predetermined time interval (e.g. three times a predetermined fixed duration between PEER_ASSERT messages, which fixed duration may for example be two seconds), the status of the terminal set for which no PEER_ASSERT messages have been received is set to inactive in the routing table 200 maintained by terminal set 100-X. Once the inactive terminal set resumes sending PEER_ASSERT messages, the status of that terminal set is reset to active.

Figure 5:
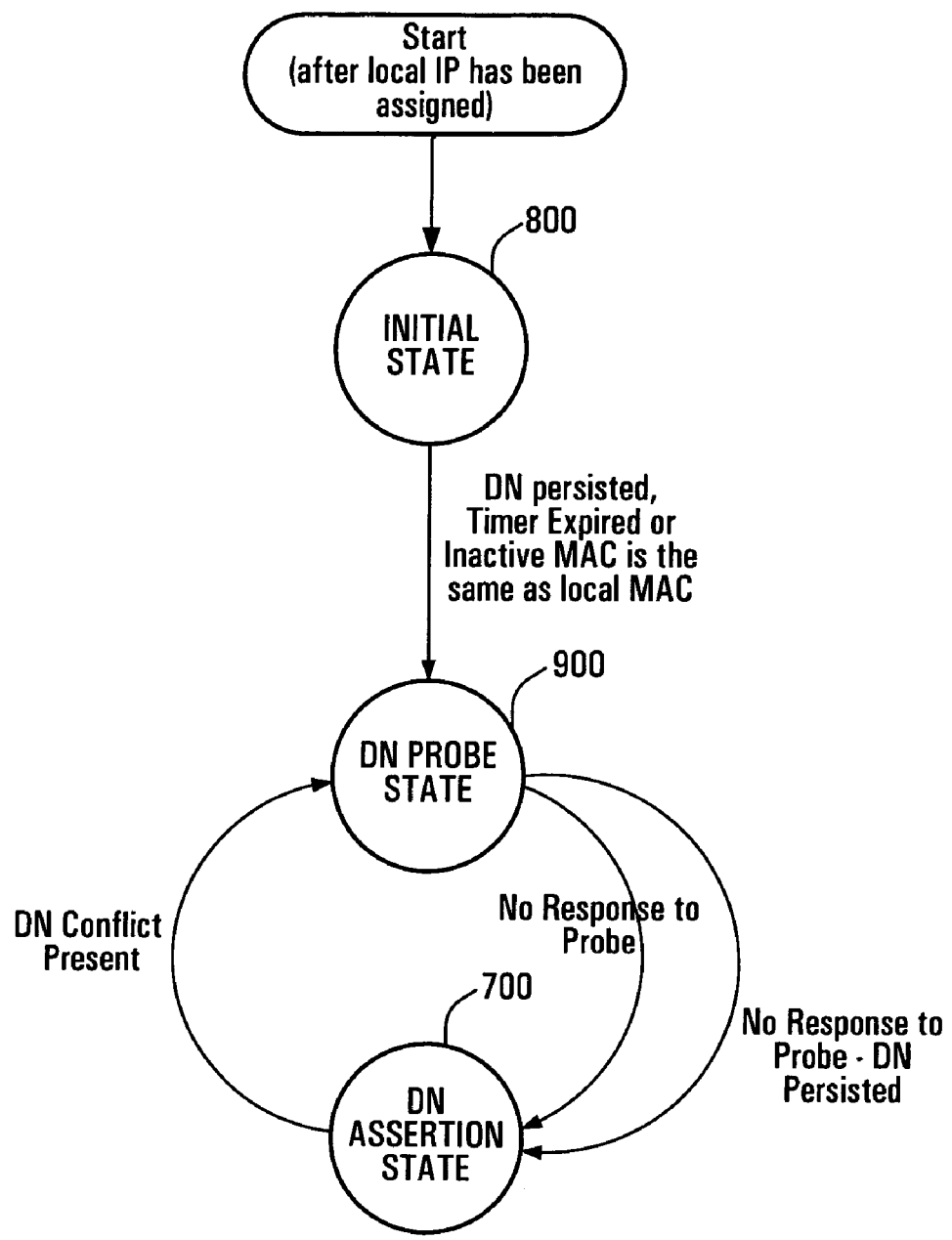
FIG. 5 is a state machine implemented by a terminal set during peer discovery.

FIG. 5 illustrates a state machine implemented by an exemplary terminal set 100-X during peer discovery according to an embodiment of the invention. For purposes of FIG. 5, is assumed that the terminal set 100-X, during the process of powering up and initialization, has obtained an IP address either from a Dynamic Host Configuration Protocol (DHCP) server on a respective network or by using a zeroconf (Internet Engineering Task Force standard, currently in Request For Comments (RFC) editor's queue as "draft-ietf-zeroconf-ipv4-linklocal-17.txt") in a manner that is known to those skilled in the art.

Once the IP address has been obtained the terminal 100-X set enters initial I_AM_HERE state 800 indicating that that terminal set 100-X has a presence on the network 30. In this state 800, terminal set 100-X "announces itself" by notifying the other terminal sets on network 30 of its presence on the network 30 and starts receiving notifications from other network devices regarding their presence on the network 30. In the present embodiment, the terminal set 100-X announces itself by way of an I_AM_HERE message containing the MAC address and IP address of the terminal set 100-X which is multicast to other terminal sets in the network.

The terminal set sends the I_AM_HERE multicast message N times, where N is a positive integer greater or equal to 1. In embodiments in which terminal sets form part of a very large network, it is possible that several or all terminal sets be powered simultaneously and thus respective receive buffers at the terminal sets within the network may receive several messages at one time. In some embodiments of the invention, for each terminal set, N is equal to three or higher to ensure that the I_AM_HERE multicast messages are delivered to the other terminal sets even if the receive buffers have overflowed. The I_AM_HERE multicast messages are sent at random intervals (e.g. each between zero and two seconds). Sending the N I_AM_HERE messages at random intervals, rather than at fixed intervals, may reduce the risk of the I_AM_HERE multicast message not being received by one or more terminal sets. If fixed intervals were used, the order in which I_AM_HERE messages from different terminal sets would appear at a given terminal set during each of the N transmission intervals may be the same for each interval, and the messages arriving last may be consistently dropped. By sending messages at random intervals, the order in which messages arrive during one interval may differ from the order in which they arrive during another interval. Thus the terminal set(s) whose message(s) is (are) dropped may change from interval to interval, and there may be a greater likelihood that one of the N I_AM_HERE messages from a particular terminal set will be received.

It is noted that the above description assumes a messaging protocol in which the receipt of individual messages is not expressly acknowledged, which may be favored in view of a possible reduction in overall message traffic in comparison to a protocol in which an express acknowledgement is sent upon the successful receipt of a message.

While in Initial State 800, the terminal set 100-X also waits for messages from other terminal sets within the network 30 which contain information necessary to build or update the routing table 200 (FIG. 4).

From the Initial State 800, the state machine transitions to a DN Probe State 900 upon the occurrence of any of three events. The first event is the expiry of a predetermined time interval intended to provide sufficient time for the terminal set 100-X to receive I_AM_HERE messages from other terminal sets and build its routing table 200. The second event is a determination that the current terminal set 100-X already has a DN stored in its non-volatile memory. The third event is the receipt of an INACTIVE_PEER_ASSERT message having a MAC address which matches the MAC address of the current terminal set 100-X, which reflects a situation in which the current terminal set 100-X is returning to the active state and has just received an INACTIVE_PEER_ASSERT message sent on its behalf by its surrogate.

In the DN Probe State 900, the terminal set 100-X selects a prospective DN and sends M DN_PROBE multicast message to the other terminal sets to determine whether any of the other terminal sets have any objections to set 100-X claiming the prospective DN, where M is an integer greater than or equal to one. The rationale for possibly sending more than one DN_PROBE message is to increase the likelihood that each of the other terminal sets on the network will receive at least one copy of the message. In the present embodiment, the DN_PROBE message contains the MAC address and IP address of the sending terminal set as well as the prospective DN selected by the sending terminal set. If there is no response to the DN_PROBE messages from the other terminal sets, it is assumed that no other terminal set has any objection, and the terminal set 100-X enters a DN Assertion State 700 in which it claims the DN as its own. This is done regardless of whether the prospective DN of the current terminal set is a freshly selected DN or a persistent DN recalled from non-volatile memory.

The DN Assertion State 700 represents the steady state in which the terminal set 100-X has successfully claimed a DN. In this state, the terminal set 100-X periodically sends a PEER_ASSERT multicast message to the other terminal sets within the network to provide a periodic indicator that the terminal set remains active and "healthy". The PEER_ASSERT message of the present embodiment includes an IP address, a MAC address, and a claimed DN. The PEER_ASSERT message also includes an indication of any pages currently being performed by the terminal set 100-X (as will be described in more detail in the "PAGING" section, below). If a conflict is found to exist between the claimed DN and a DN claimed by another terminal set while in the DN Assertion State 700, the state machine transitions back to DN Probe State 900. An example of a situation in which a conflict may be found to exist may be the case in which a network becomes segmented into two sub-networks (e.g. upon failure of a Virtual Private Network (VPN) which normally interconnects two sub-networks in geographically remote locations). While the network is segmented, it is possible that terminal sets may be plugged into the separate segments, with different terminal sets on different sub-networks claiming the same DN. When the network segments are re-connected, a conflict may be found to exist. In this case, resolution of the conflict is necessary.

Figure 6:
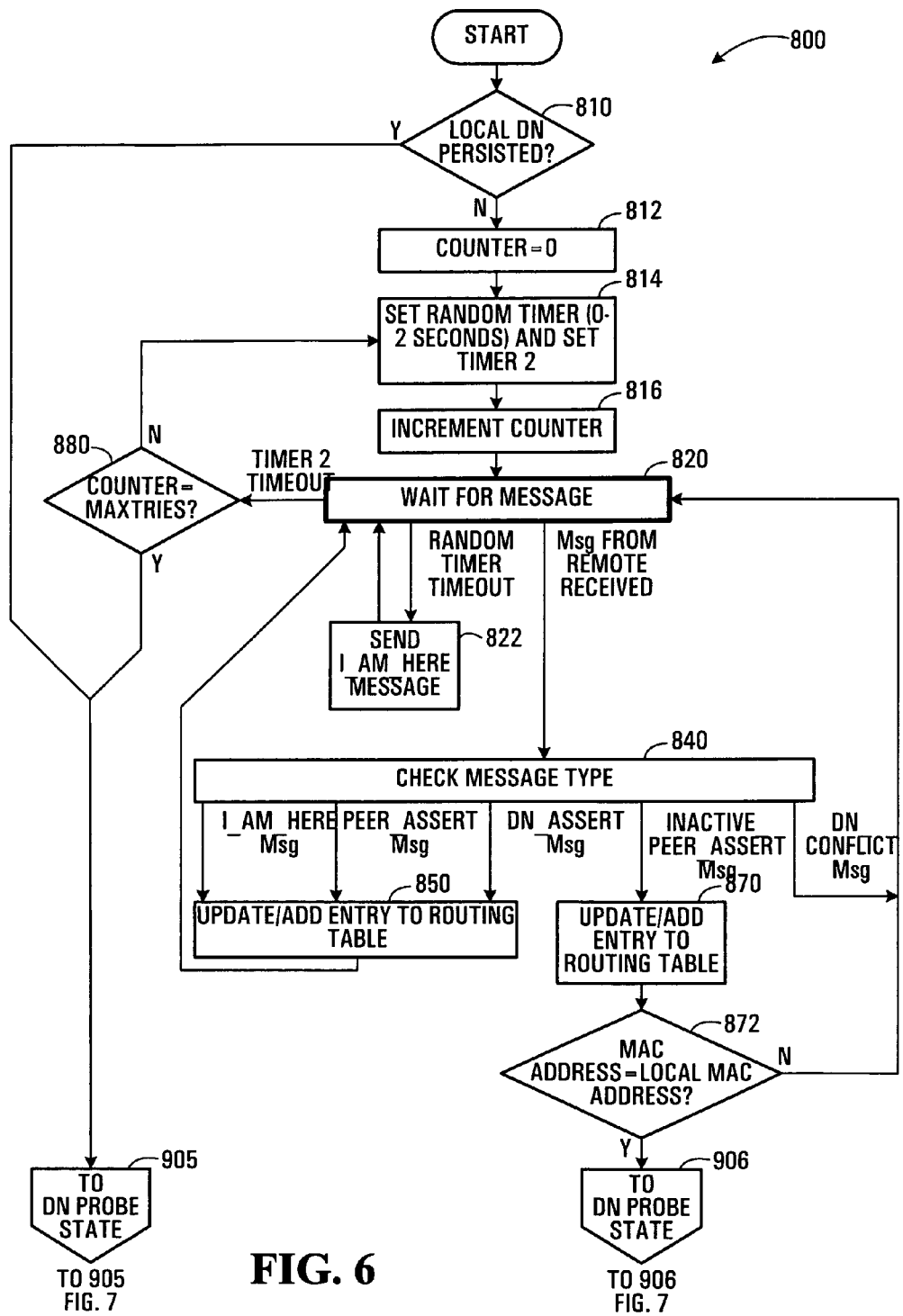
FIG. 6 is a flow chart illustrating operation of a terminal set in an Initial State shown in FIG. 5.

FIG. 6 is a flow chart illustrating operation of a terminal set 100-X in the Initial State 800 of FIG. 5. Initially, a determination is made as to whether or not a DN for the current terminal set 100-X has persisted (810). In the present embodiment, a DN will have persisted if the terminal set 100-X has previously been through the initialization state 800, the DN Probe State 900 and the DN Assertion State 700, so as to have previously claimed a DN. In this case the claimed DN will have been stored in non-volatile memory, such as a flash memory for example. The purpose of storing the DN in non-volatile memory is to preserve the DN in the event that the terminal set 100-X becomes inactive, e.g., due to accidental power loss or disconnection from the network 30, so that the DN may be reclaimed upon a return to an active state.

If it is determined at 810 that a DN has persisted for terminal set 100-X, the state machine transitions (905) to the DN Probe State 900. The presumption is that, in this case, the other terminal sets on the network will already have been notified of the presence of terminal set 100-X on the network, even if the other terminal sets currently consider the terminal set 100-X to be inactive.

If, on the other hand, it is determined at 810 that the terminal set does not have a persistent DN, this indicates that the terminal set 100-X is in an as-yet unconfigured (in terms of DN and routing table 200) "factory-fresh" condition. In this case, a counter used to track how many of the N instances of the I_AM_HERE message have been sent is initialized to zero (812). A random timer is then set between 0 and 2 seconds and a second timer is set for 2 seconds (814). The interval of 2 seconds for the second timer is to ensure that sufficient time is given to receive messages from other network devices for purposes of building routing table 200 (FIG. 4). Of course, this duration could differ in other embodiments. The counter is incremented (816) and the terminal set enters a "wait for message" state (820) in which it waits for a message to be received.

If the random timer expires while in the wait for message state, an I_AM_HERE multicast message is sent to the other terminal sets (822) and the terminal set 100-X returns to the wait for message state (820).

Any messages received from any other terminal set in the network at 820 are checked for a type (840).

If the received message is a DN_CONFLICT message, then the terminal set ignores the DN_CONFLICT message (since this message should not be received in the Initial State 800) and the state machine returns to the wait for message state (820).

If the received message is a I_AM_HERE message sent by another terminal set, then data from the received I_AM_HERE message (e.g. MAC address and IP address) is added to the routing table 200.

If the received message is a PEER_ASSERT message or a DN_PROBE message sent by another terminal set, then data within the PEER_ASSERT or DN_PROBE message may be added to the routing table 200 (these messages are described in more detail below).

If the received message is an INACTIVE_PEER_ASSERT, data contained within the INACTIVE_PEER_ASSERT message may be used to update the routing table 200 (870) (e.g. if the sending terminal set was not previously in the routing table 200, it may be added). Thereafter the MAC address in the INACTIVE_PEER_ASSERT message is compared to the local MAC address (i.e. the MAC address of the current terminal set 100-X) (872).

If they are found to be the same, this represents a situation in which the current terminal set 100-X is returning to an active state after a period of inactivity and has just received a message from another terminal set which is sending INACTIVE_PEER_ASSERT messages on behalf of terminal set 100-X. In this case, the terminal set will transition to the DN Probe State (905).

If, on the other hand, the MAC address in the received INACTIVE_PEER_ASSERT message is different from the local MAC address, then the terminal set returns to the wait for message state and waits for further messages (820).

When in the wait for message state, if the second timer expires, an assessment is made as to whether the counter has reached the maximum value of N (880).

If this assessment reveals that the value of the counter has not exceeded N, this indicates that fewer than N I_AM_HERE messages have been sent. In this case, the random timer and the second timer are reset (814) and the value of the counter is incremented (816) before returning to the wait state (820).

If, on the other hand, the assessment of 880 reveals that the value of the counter has is equal to N, this indicates that N I_AM_HERE messages have been sent. In this case, the state machine of terminal set 100-X transitions to the DN Probe State (906).

Figure 7:
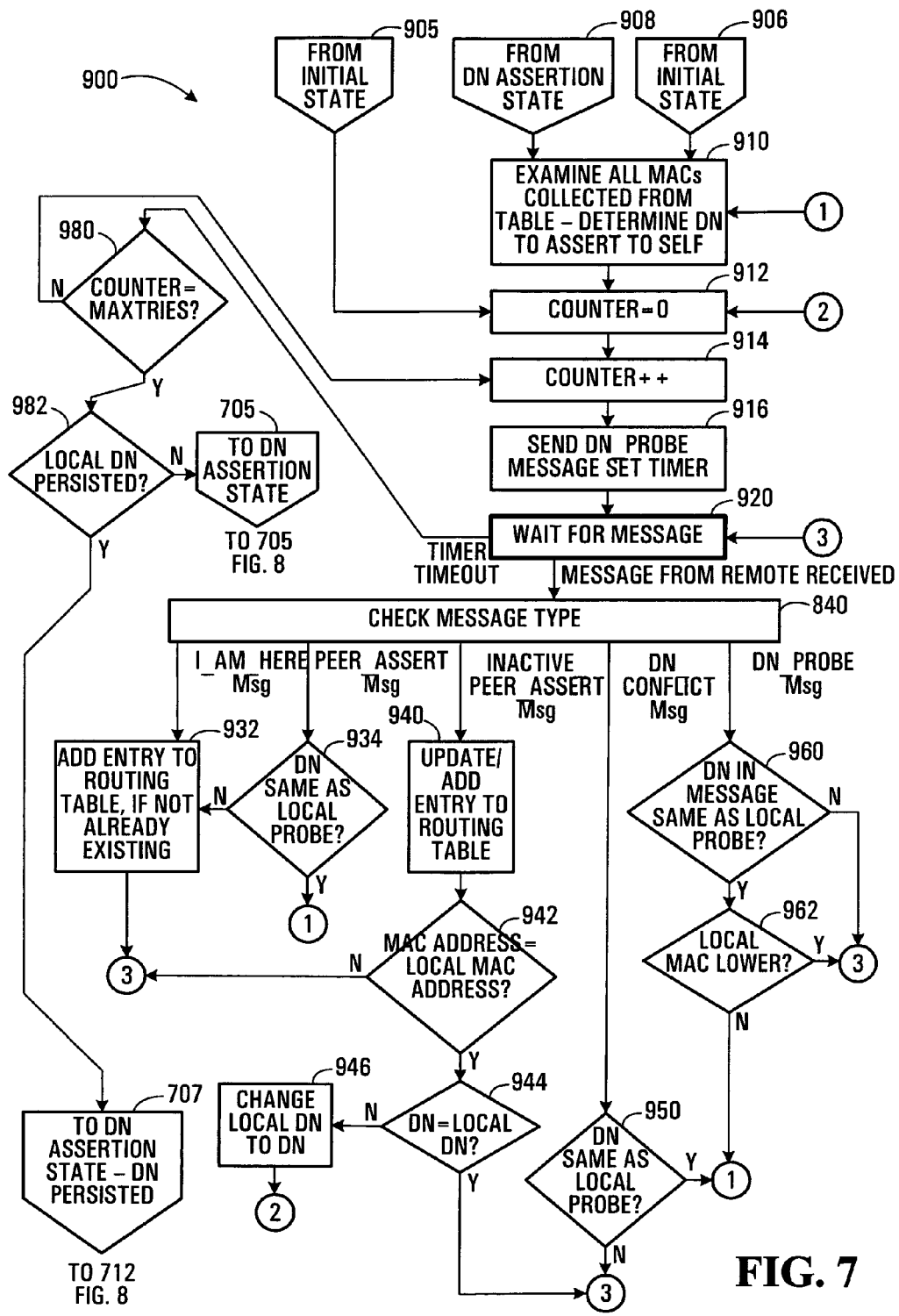
FIG. 7 is a flow chart illustrating operation of a terminal set in a Directory Number Probe State shown in FIG. 5.

FIG. 7 is a flow chart illustrating operation of a terminal set 100-X in the DN Probe State 900 of FIG. 5. As shown in FIG. 7, there are two entry points into the DN Probe State 800. The first entry point is from the Initial State 900 at 905, and represents a situation in which the current terminal set has recalled its DN from non-volatile memory after a period of inactivity. The second entry point is also from the Initial State 800, but at 906 and represents a situation in which the terminal set 100-X has not previously claimed a DN. In the latter case, the terminal set selects a prospective DN at 910 (in the former case, the prospective DN will be the recalled DN).

To select a prospective DN (910), the terminal set 100-X, terminal set 100-X determines its ordinal position within the (sorted) list of terminal sets of routing table 200 (FIG. 4). For example, if terminal set 100-X is first in the list, the selected prospective DN may be 1 (its ordinal position) plus a base DN of, say, 200, for a prospective DN of 201. By basing the selection of a prospective DN on the unique ordinal position associated with the terminal set, selection of a unique prospective DN by each terminal set will be promoted in the scenario in which multiple factory-fresh terminal sets simultaneously join a network having no existing terminal sets with previously assigned DNs.

To guard against potential DN conflicts which may occur if terminal set 100-X is joining an established network, at 910 terminal set 100-x also consults its routing table 200 (FIG. 4) to determine whether the selected prospective DN is already assigned to another terminal set. If the prospective DN is already assigned, the newly-connected DN may select another prospective DN, e.g. by adding an offset such as 1 to the largest DN found in the list.

Following 910 (or from entry point 905), a counter whose purpose is to track the number of instances of the DN_PROBE message that have been sent is initialized (912) and incremented (914). An instance of the DN_PROBE message is sent and a timer used to count down the (fixed or random) time interval between DN_PROBE message instances is set (916). The terminal set 100-X then enters a "wait for event" state (920).

If a terminal set selects the same DN as another terminal set also in the probe state the terminal will look at the MAC address of both devices probed on the network a conflict is raised. In one embodiment, when there is conflict between terminal sets having the same DN, the terminal set having the lowest MAC address keeps the DN and the other terminal set must obtain another DN.

It is noted that a further entry point (908) into DN Probe State 900 exists from the DN Assertion State 700. This entry point 908 represents a situation in which a conflict has been found to exist between the DN claimed by the terminal set 100-X and the DN desired or claimed by one or more of the other terminal sets within the network. In such a case, operation commences at 910, described above.

From the wait for event state (920), if the timer expires, the terminal set 100-X ascertains whether the desired number M of DN_PROBE messages have already been sent (980). If it is determined that M DN_PROBE messages have already been sent, the terminal set next determines whether the prospective DN as been recalled from DN in the non-volatile memory (982). If the determination of 982 is made in the positive, the state machine transitions to the DN Assertion State 700 via 707; otherwise it transitions to the DN Assertion State 700 via 705.

Alternatively, if it is determined at 980 fewer than M DN_PROBE messages have been sent, operation returns to 914.

From the wait for event state (920), when a message is received from another terminal set, further operation depends upon the message type of the received message, which is ascertained at 930.

If the message type indicates an I_AM_HERE message, the terminal set adds data contained within the I_AM_HERE message to the routing table 200 if the data is not already present (932) before returning to the wait for event state (920).

If the message type indicates a PEER_ASSERT message, the DN from the PEER_ASSERT message compared to the local DN (i.e. the selected prospective DN) (934). If the DNs match, this represents a situation in which another terminal set is asserting the DN that terminal set 100-X has tentatively selected. In this case, operation returns to 910. If, on the other hand, the DNs do not match, the routing table 200 is updated with the data contained in PEER_ASSERT message if an entry for the terminal which sent the PEER_ASSERT message already exists, or if the entry does not already exist, the data contained in the PEER_ASSERT message is added to the routing table 200 to create the entry (932).

If the message type indicates an INACTIVE_PEER_ASSERT message has been received, the data contained in the INACTIVE_PEER_ASSERT message is added to the routing table 200 if an entry does not already exist or the routing table 200 is updated with the data if the entry does exist (940). Then the MAC address within the INACTIVE_PEER_ASSERT message is compared to the MAC address of terminal set 100-X (942).

If the MAC addresses differ, then the terminal set 100-X returns to the wait for event state (920).

Alternatively, if the MAC addresses are the same, this represents a situation in which the current terminal set 100-X is returning to an active state after a period of inactivity and has just received a message from another terminal set which is sending INACTIVE_PEER_ASSERT messages on behalf of terminal set 100-X. In this case, a further comparison is made (944) between the DN within the INACTIVE_PEER_ASSERT message and the DN currently being probed (i.e. the selected prospective DN).

If the DNs do not match, this represents a situation in which the terminal set 100-X is currently probing a DN which differs from the DN specified in the INACTIVE_PEER_ASSERT message. This may occur if the persistent DN stored in non-volatile memory of the terminal set 100-X was cleared or became corrupted while the terminal set 100-X was inactive. In this case, to prevent the terminal set 100-X from probing a different DN that was previously claimed, the selected prospective DN is reset to the DN from the message (946), and operation returns to 912 so that the terminal set 100-X will take steps to probe its previously claimed DN.

Alternatively, if the DNs are found to match (at 944), this represents a situation in which the terminal set 100-X is currently probing the same DN as is specified in the INACTIVE_PEER_ASSERT message, which should represent the DN previously claimed by terminal set 100-X before it was determined to be inactive. In this case, operation returns to the wait for event state (920).

If the message type indicates a DN_CONFLICT message is being received, this may represent a situation in which another terminal set is objecting to the probed prospective DN. In this case, a comparison is made (950) between the DN within the DN_CONFLICT message and the DN currently being probed.

If the DNs do not match, no further action is taken with respect to the DN_CONFLICT message, and operation returns to the wait for event state (920). In the case where the DN_CONFLICT message is multicast, this represents ignoring a DN_CONFLICT message intended for another terminal set. In the case where the DN_CONFLICT message is unicast, this may represent a situation in which a second of two DN_CONFLICT messages from different terminal sets has been received and is being ignored because, since the first DN_CONFLICT message was received, the current terminal set has begun probing a different DN than it had probed earlier.

Alternatively, if the DNs are found to match at 950, this represents a situation in which another terminal set is objecting to the DN prospectively selected by the current terminal set 100-X. In this case, operation returns to 910 so that another prospective DN may be selected and probed.

If the message type indicates a DN_PROBE message has been received, another terminal set is probing a selected prospective DN in much the same manner as the current terminal set 100-X is probing its selected prospective DN. The prospective DN of the other terminal set (which is indicated in the incoming DN_PROBE message) is compared to the locally selected prospective DN (960).

If the DNs do not match, no further action is taken with respect to the incoming DN_PROBE message, and operation returns to the wait for event state (920).

Alternatively, if the DNs are found to match at 960, this means that another terminal set is probing the same DN as the current terminal set 100-X. In this case, a conflict exists between the prospective DNs. In the present embodiment, such conflicts are resolved on the basis of the unique MAC addresses of the respective terminal sets. In particular, the terminal set having the lowest MAC address ("lowest active MAC" or LAM) is allowed to claim the DN, and the other terminal set will select another DN. It will be appreciated that other equally valid conflict resolution schemes may be applied. For example, the highest active MAC may be allowed to claim the DN in an alternative embodiment. The details of the chosen scheme are not important as long as the scheme is consistently applied at each terminal set.

Thus, according to the operative conflict resolution scheme, the MAC address within the DN_PROBE message is compared to the local MAC address (962). If the MAC address within the DN_PROBE message has a lower value than that of the local MAC address, the other terminal set is permitted to claim the DN, and the current terminal set returns to 910 to select another prospective DN. Otherwise, the terminal set ignores the DN_PROBE message by returns to the wait for event state (920), effectively maintaining its prospective DN.

Figure 8:
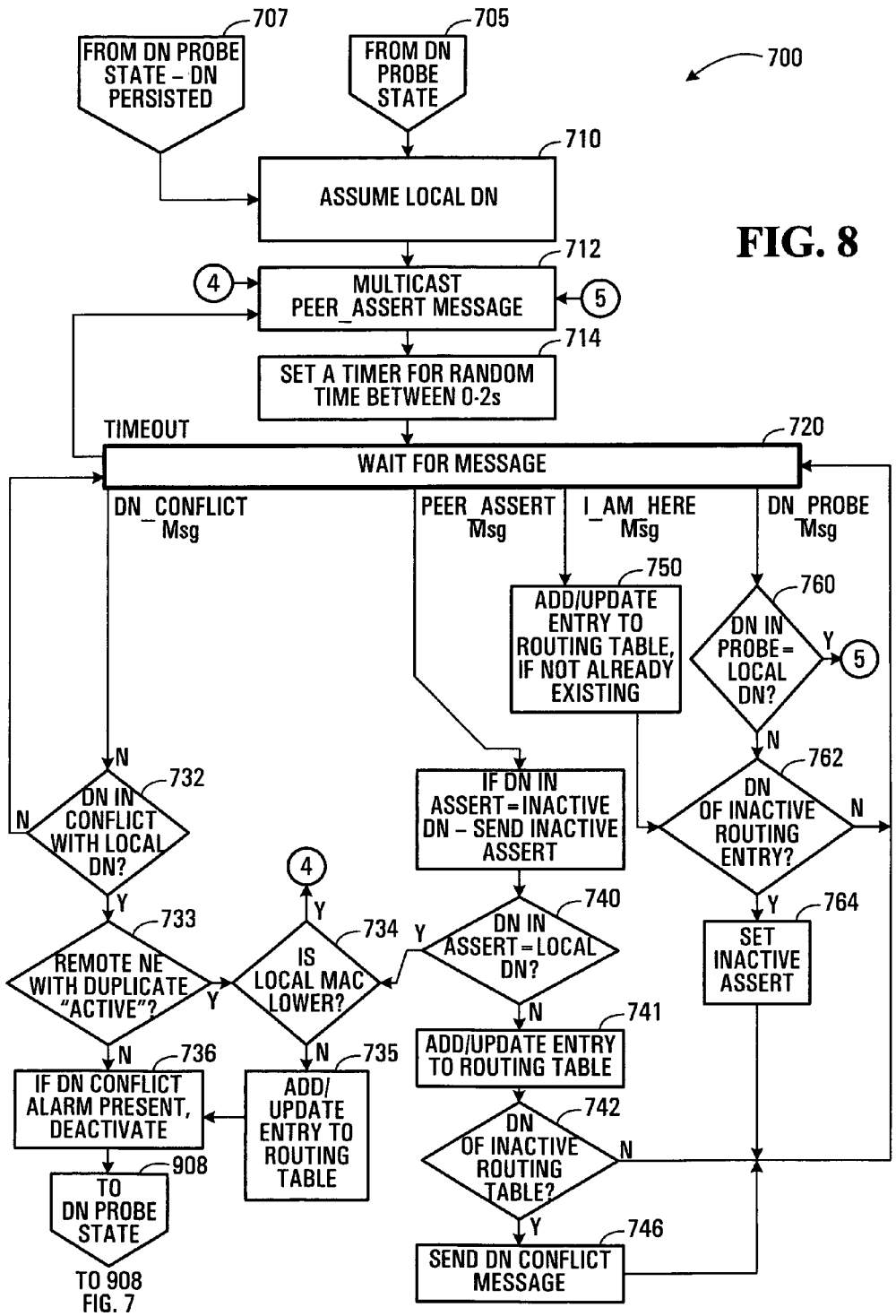
FIG. 8 is a flow chart illustrating operation of a terminal set in a DN Assertion State shown in FIG. 5.

FIG. 8 is a flow chart illustrating operation of the terminal set 100-X in the DN assertion state shown in FIG. 5. As previously described, the terminal set may transition into this state from the DN Probe State 900 without a persistent DN (705). In this case, the terminal set 100-X initially assumes the prospective DN which was just probed in the DN Probe State 900 (710). Subsequently, a multicast PEER_ASSERT message sent to other terminal sets on the network (712).

Alternatively, the terminal set may transition from the DN Probe State 900 with a persistent DN (707), in which case operation begins at 712.

Following 712, a timer is set for a random time interval between 0 seconds and 2 seconds (714). The terminal set 100-X then waits for a message to be received or for a timer to expire in the "wait for message" state (720).

If the timer expires, operation returns to 712, and another multicast PEER_ASSERT message is sent.

If a DN_CONFLICT message is received, then the terminal set verifies whether the DN contained in the DN_CONFLICT message is in conflict with the local DN (732).

If it is determined that the DN contained in the DN_CONFLICT message matches the locally claimed DN, this is indicative of a conflict due to duplicate DNs on the network. In this case, a further assessment is made as to whether the remote conflicting terminal set is active (733).

If the remote set is found to be active, and if the operative conflict resolution scheme (i.e. lowest active MAC address prevails) indicates that the current terminal set should keep its claimed DN (734), operation returns to 712, causing the terminal set to immediately send another PEER_ASSERT message.

If, on the other hand, it is determined in 734 that the current terminal set should not keep its claimed DN, the routing table 200 (FIG. 4) is updated with the data in the DN_CONFLICT message (735). Specifically, the terminal set having the conflicting DN may be added to the routing table 200, along with its DN. This is so that, on a subsequent selection by the current terminal set 100-X of a prospective DN which happens to match the conflicting DN, a check of the prospective DN against the DNs in the routing table 200 will reveal the conflict.

Thereafter, any conflict alarms are deactivated (736) and the terminal set 100-X transitions to the DN Probe State 900 (908). A conflict alarm is a notification of a DN conflict which may be sent to a system administrator in some embodiments of the invention. Conflict alarms are usually raised only in cases where a system administrator has manually reset a DN to an existing terminal set's claimed DN.

If it is determined at 733 that the remote terminal device is inactive, then any DN present conflict alarms are deactivated (736) and the terminal set transitions to the DN Probe State 900 (908).

Referring again to the wait for message state 720, if a PEER_ASSERT message is received, and if the DN in the PEER_ASSERT message is equal to a DN of one or more inactive terminal sets in the routing table 200, this represents a situation in which the current terminal set 100-X may be required to send an INACTIVE_PEER_ASSERT message on behalf of an inactive terminal set. This situation may arise for example where a network becomes segmented into two sub-networks such that terminal sets on one sub-network consider terminal sets on another sub-network to be inactive. A terminal set on one sub-network may be sending PEER_ASSERT messages while its surrogate, which is on the other sub-network, is sending INACTIVE_PEER_ASSERT messages on its behalf. On reconnection of the sub-networks, the surrogate could receive a PEER_ASSERT from the terminal set it still believes to be inactive.

The determination of whether the current terminal set 100-X should to send an INACTIVE_PEER_ASSERT message on behalf of an inactive terminal set based on an operative scheme for determining which terminal set is responsible (or which terminal sets are responsible) for sending INACTIVE_PEER_ASSERT messages on behalf of an inactive peer. In the present embodiment, the operative scheme assigns this responsibility to one and only one terminal set per given inactive peer (with the same terminal set possibly being responsible for multiple inactive peers). The rationale for making only one terminal set responsible for sending INACTIVE_PEER_ASSERT messages for any given inactive peer is to avoid unnecessary transmission of duplicate INACTIVE_PEER_ASSERT messages. For such schemes, it is desirable to ensure that each terminal set stays within its Initial State 800 (FIG. 5) for a duration that is longer than the time required to detect an inactive terminal set.

The operative scheme is illustrated in Table 1 below:

TABLE 1

Peers Responsible for Inactive Peer Asserts

| Tel. set | State | Sends Inactive Asserts? | On behalf of? |
|---|---|---|---|
| A | Inactive | — | — |
| B | Active | Yes | B |
| C | Inactive | — | — |
| D | Active | No | — |
| E | Active | Yes | F, G |
| F | Inactive | — | — |
| G | Inactive | — | — |
| H | Active | Yes | A |

The first two columns of Table 1 represent a subset of the information maintained in the routing table 200 of FIG. 4 which is relevant to the determination of "surrogate" peers (i.e. peers responsible for sending INACTIVE_PEER_ASSERT messages on behalf of other inactive peers). Each row in Table 1 represents a network device, as identified in the first column, in a hypothetical network. The network devices of Table 1 are understood to be sorted by some unique identifier, such as MAC address, as in routing table 200. The active or inactive status of each network device is provided in the second column of Table 1.

In the operative scheme, an active network device acts as the surrogate for each inactive network device which follows it (i.e. is in a lower row) in Table 1 with no active network device interceding in the list between the surrogate and the inactive network device. For example, as shown in Table 1, network device E acts as the surrogate for network devices F and G, since both of those devices are inactive and follow device E with no other active device interceding between them and device E.

In the event that an inactive network device precedes the first active network device within the sorted list (e.g., as is the case for network device A), then the last active network device within the sorted list (network device H) will acts as its surrogate.

It will be appreciated that other schemes for assigning surrogates may be adopted in alternative embodiments. For example, one alternative scheme may assign an active network device as a surrogate for inactive devices preceding it, rather than succeeding it, in the routing table. In another scheme, a network device may act as a surrogate for all inactive devices adjacent to it within the table, with the term "adjacent" as used herein including multiple contiguous inactive network devices either immediately above or immediately below a surrogate within a routing table. In the latter scheme, each inactive network device will have two surrogates. This level of redundancy may be desired in some embodiments.

Referring again to FIG. 8, following 738, terminal set 100-X verifies whether a DN contained in the received PEER_ASSERT message matches to the locally claimed DN (740). If they match, operation proceeds with 734 as previously described. If the DNs do not match, the terminal set 100-X either adds the data within the PEER_ASSERT message to the routing table or uses it to update the relevant entry in the table (741).

Next, an assessment is made as to whether the DN contained in the PEER_ASSERT message corresponds to a DN of an inactive entry for which the current terminal set 100-X acts as a surrogate (742). If the assessment is made in the positive, a DN_CONFLICT message is sent as a multicast message indicating a conflict in DNs (746) before returning to 720 to wait for another message. If the assessment of 742 is made in the negative, the terminal set 100-X immediately returns to 720 to wait for another message.

If an I_AM_HERE message is received while in the wait for message state 720, the terminal set 100-X adds or updates the entry in the routing table 200 (FIG. 4) which corresponds to the terminal set from which the I_AM_HERE message originated with data from the I_AM_HERE message (750), and then proceeds to 762 (described below).

If a DN_PROBE message is received at 720, the terminal set compares the DN in the DN_PROBE message with the locally claimed DN (760). If they match, this represents a situation in which another terminal set has selected the claimed DN of the current terminal set 100-X as its prospective DN. In this case, operation returns to 712 to immediately transmit a multicast PEER_ASSERT message to effectively notify the other terminal set that the DN which it has tentatively selected is already claimed.

If the comparison of 760 shows that the DNs do not match, terminal set 100-X consults the routing table 200 to determine whether the DN contained in the DN_PROBE message corresponds to a DN of an inactive terminal set (762). If the DN contained in the DN_PROBE message corresponds to an inactive terminal set, an INACTIVE_ASSERT_MESSAGE message is sent to a terminal set from which the DN_PROBE message originated, presuming that the current terminal set is deemed to be the surrogate for that inactive terminal set (using the above-described operative scheme). Thereafter, operation returns to 720 to await another message. If the consultation performed in 762 indicates that the originator of the DN_PROBE message is active, terminal set 100-X returns directly to 720 to wait for another message.

Thus, summarizing peer discovery operation, when multiple terminal sets implementing the state machine of FIG. 5 are connected to a network and engage in the above-described operation to arrive at the steady state (i.e. the DN Assertion State 700), each will have automatically selected a DN, with any DN conflicts between terminal sets having been automatically resolved without the need for human intervention. Moreover, each terminal set will have automatically created a local routing table 200 including the DN of every other terminal set on the network paired with other information (e.g. IP addresses) sufficient to permit the terminal set to call any other terminal set upon the dialing of that terminal set's DN. Moreover, even if the terminal set becomes inactive, when it is reconnected to the network its DN will persist.

Paging

When a terminal set is connected to the distributed telephony system 10 of FIG. 1, a system administrator configures the terminal set by specifying a paging zone for that terminal set. A paging zone is group of one or more recipient terminal sets that are capable of simultaneously receiving a page directed to the group using methods that are described below. For example, all of the terminal sets in a common physical location, such as a floor of a building or a particular room, may be made members of a single paging zone (when a paging zone is specified for a terminal set, the terminal set is said to be a "member" of that zone). In an exemplary embodiment, each terminal set is a member of only one paging zone (although this is not a requirement).

When a terminal set of FIG. 1 periodically sends a PEER_ASSERT message (described above) to all other terminal sets in the system 10, the terminal set includes an indication of whether or not the terminal set is presently paging any of the paging zones in the system 10, and if so, which paging zone is being paged. Every other terminal set in the system 10 receiving the PEER_ASSERT message extracts this information and stores it as paging field 292 of routing table 200 (FIG. 4) for the sending terminal set.

Figure 9A:
FIGS. 9A and 9B illustrate exemplary values of a paging field shown in FIG. 4.
Figure 9B:

FIGS. 9A and 9B illustrate exemplary values of the paging field 292. In the present embodiment, the paging field 292 is a byte in which each bit represents a particular paging zone. Accordingly, up to eight paging zones may be defined. When one of the bits of paging field 292 is set to 1, this indicates that the terminal set which sent the PEER_ASSERT message containing that paging field is presently claiming the corresponding paging zone for its own exclusive use (i.e. is sending a page to that zone, or is about to do so). In the illustrated embodiment, the position of the bits in the paging field 292 is indicative of the represented paging zone. For example, the first (i.e. rightmost or least significant) bit indicates whether or not the sending terminal set has asserted an exclusive claim to paging zone 1; the second bit indicates whether or not the sending terminal set has asserted an exclusive claim to paging zone 1; and so forth. For example, referring to FIG. 9A, the value 0000001 indicated at 52 indicates that the sending terminal set has asserted a claim to paging zone 1. If terminal set that had previously sent this value wishes to indicate that it has deasserted a claim to paging zone 1, it would send a byte comprising eight zeroes (i.e. 00000000), with the rightmost bit value of 0 being indicative of the deassertion. Alternatively, referring to FIG. 9B, the value 0000010 indicated at 54 indicates that the sending terminal set has asserted a claim to paging zone 2. According to this scheme, no one terminal set should ever send a value for paging field 292 that includes more than one "1", since no one terminal set should be able to page to more paging zones than one. The exception to this rule is the "all zones" setting (11111111), which indicates that the sending terminal has asserted a claim to all paging zones in the system. Accordingly, it should now be appreciated that no two rows of routing table 200 (FIG. 4) should have (non-transient) paging field values 292 in which the same Mth bit (where M=1 to 8) is set to "1", since no two terminal sets should be allowed to send a page to the same paging zone. The primary reason for this mutual exclusivity is to ensure that, for each paging zone, only one source of page content (e.g. one source for audio messages) is transmitting at any given time.

Figure 9C:
FIG. 9C illustrates an exemplary amalgamation of paging field values from other terminal sets which may be used to represent all paging currently ongoing in the system of FIG. 1.

A terminal set receiving various values as exemplified in FIGS. 9A and 9B amalgamates the values in a locally-maintained value which provides an indication of which paging zones of the system 10, if any, are presently being claimed by any terminal set of FIG. 1. For example, FIG. 9C illustrates an exemplary amalgamation 56 of the paging field values illustrated in FIGS. 9A and 9B. It will be appreciated that this amalgamation 56 is simply the values of FIGS. 9A and 9B "ORed" together. Other methods for amalgamating paging zone assertions will be readily apparent to those skilled in the art. As will be described, this amalgamation is referred to by a terminal set to determine whether any other terminal sets are sending a page to a paging zone of interest before the terminal set attempts to send a page to that paging zone.

Figure 10:
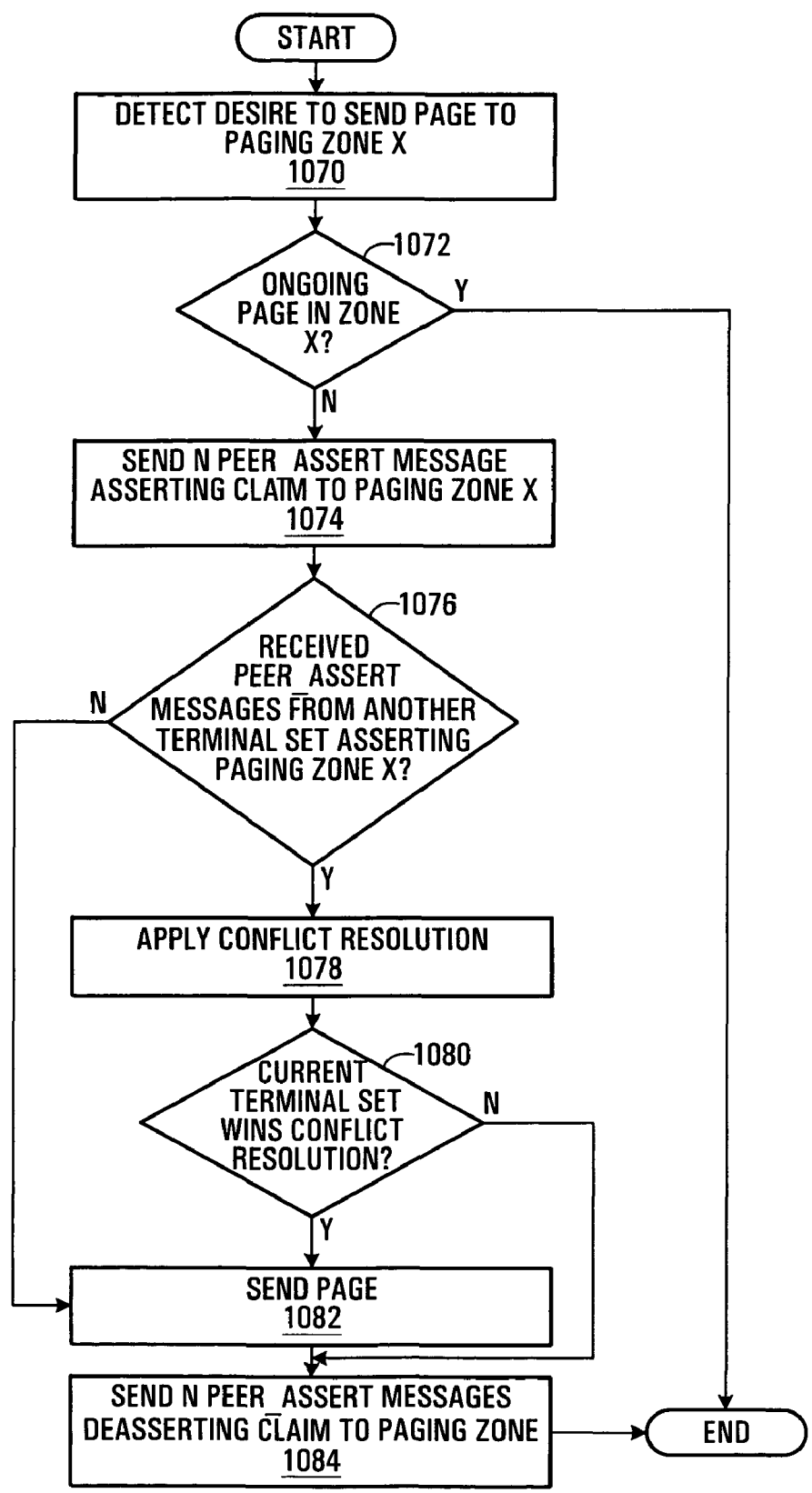
FIG. 10 is a flow chart illustrating operation for sending a page implemented by an exemplary terminal set of FIG. 1.
Figure 11:
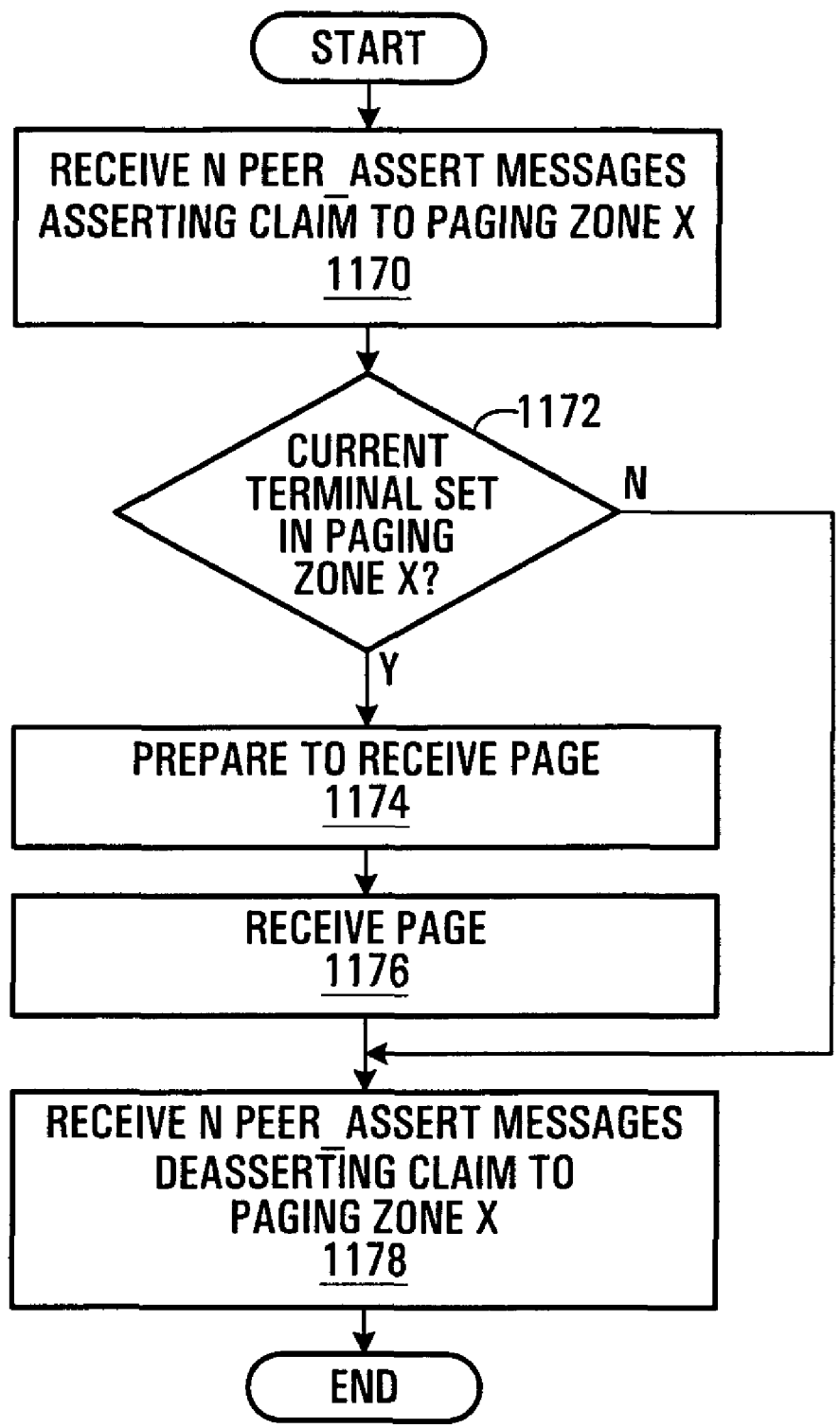
FIG. 11 is a flow chart illustrating operation for receiving a page implemented by an exemplary terminal set of FIG. 1.

FIG. 10 illustrates operation of a terminal set for sending a page. FIG. 10 is perhaps best viewed conjunction with FIG. 11, which illustrates complementary operation of a terminal set for receiving a page. The following description of FIGS. 10 and 11 provides an overview of paging operation. As an illustrative example, paging by terminal set 100-3 of the terminal sets 100-1 and 100-2 in paging zone 1 (FIG. 1) will be described.

Referring to FIG. 10, when a user of paging set 100-4 indicates a desire to send a page to paging zone 1, (e.g. presses paging button 113 of FIG. 1 and specified "zone 1"), the terminal set will detect this (at 1070). Terminal set 100-3 will initially assess whether paging zone 1 is already receiving a page from any other terminal sets (1072). Like all other terminal sets in the system 10, terminal set 100-3 will be cognizant of all ongoing pages in the system at any given time in view of the fact that each terminal set will have notified all other terminal sets of any current pages to other terminal sets by way of the paging field 292 of its PEER_ASSERT messages, with the notification including an indication of the paging zone to which the page is to be sent as previously described. This "amalgam" of all ongoing pages may for example be represented at terminal set 100-3 using the representation shown in FIG. 9C.

If terminal set 100-3 determines that the desired zone is already receiving a page from another terminal set (e.g. by determining that the bit of the "amalgam" representing paging zone 1 is set), paging is precluded, at least until the terminal set currently sending to that paging zone finishes sending its page. In this case operation shown in FIG. 10 terminates.

For clarity, if a paging zone other than the desired paging zone happens to already be in use, this will not preclude paging, since the terminal sets in each paging zone is distinct in the present embodiment.

It is noted that, if it is detected at 1070 that the user has indicated a desire to send a page to all paging zones rather than a single zone, at 1072 terminal set 100-3 will assess whether any zone is already receiving a page. If so, paging is precluded, and operation terminates.

Assuming that it is determined at 1072 that the desired paging zone 1 is not already receiving a page, the initiating terminal set 100-3 next sends, to all other terminal sets on the network, an indication that it is claiming the relevant paging zone(s) for its own exclusive use (1074). This indication notifies all other terminal sets of the current terminal set's intention to send a page to "target terminal" sets in the desired paging zone(s). In the present embodiment, the indication takes the form of several copies of a PEER_ASSERT message (previously described the "PEER DISCOVERY" section) that are sent to all other terminal sets (100-1, 100-2, and 100-4) in the system. In the PEER_ASSERT message, the initiating terminal set specifies the paging zone that it is claiming (or "all zones" if that is desired) by setting appropriate bits in the paging field 292 (FIGS. 4 and 9A, 9B). In the present example, the bit corresponding to paging zone 1 will be set, and all other bits will be cleared, as shown in FIG. 9A.

It is noted that the PEER_ASSERT messages are sent to all of the terminal sets in the network because, at any given moment, any other terminal set may wish to initiate page either to the same zone to in all zones, thus every set should be aware of any paging that is occurring or is about to occur in the network.

Several copies of the PEER_ASSERT message are sent in rapid succession at 1074. This is done in order to increase the likelihood of receipt of the message, in view of an operative messaging scheme in which recipients of messages do not expressly acknowledge the receipt of a message. The goal is to make each terminal set aware of the initiating terminal set's intention to send a page to the desired zone, so that any objections by other terminal sets can be raised before the initiating terminal actually begins sending the page. Alternative embodiments employing different messaging schemes may not need to send multiple copies of the same message.

The PEER_ASSERT messages also serve the purpose of notifying each terminal set in the desired paging zone of the fact that it is about to receive a page. Referring to FIG. 11, each terminal set (regardless of paging zone) receives at least one copy of the N PEER_ASSERT messages (1170). Using the received indication of a claimed paging zone (i.e. the paging field 292 (FIG. 4)) and its locally stored indication of the terminal set's own paging zone, the receiving terminal set can establish whether it is a member of the claimed paging zone (1772).

For example, at terminal set 100-1, the determination of 1172 will be made in the positive, since terminal set 100-1 is in fact a member of paging zone 1. In this case, the terminal set 100-1 will prepare for the receipt of the page, e.g., by commencing listening to a particular multicast address (described below) over which page content (e.g. audio messages) will be received (1174). On the other hand, at terminal set 100-3, the determination of 1172 will be made in the negative, thus the terminal set 100-3 does not need to engage in this preparation.

Referring again to FIG. 10, after 1074 and before sending any page content, the initiating terminal set 100-3 waits for a predetermined delay period to provide each other terminal set with an opportunity to object to set 100-3's claim to paging zone 1. In the present embodiment, an objection takes the form of one (or more) received copies of a PEER_ASSERT message in which another terminal set is simultaneously attempting to claim the same paging zone.

If such an objection is received (1076), the original initiating terminal set 100-3 and the second simultaneously initiating terminal set (e.g., 100-4) will each become aware of the other's simultaneous attempt to claim the same paging zone by receiving the other terminal set's PEER_ASSERT messages. In this case, a conflict resolution mechanism is applied by each terminal set to determine which of the two will be permitted to send the page (1078). The conflict resolution mechanism should permit each terminal set to independently reach the same conclusion about which of the two terminal sets will be allowed to send its page. In the present embodiment, a unique identifier from each terminal set 100-3 and 100-4, namely, MAC address, is compared, with the lower MAC address being permitted to send its page. Alternative embodiments may employ different schemes, possibly using different identifiers. In this case, terminal set 100-4, which has the higher MAC address (see FIG. 4, column 220), is determined to be the "losing" terminal set (1080), and is thus precluded from sending its page, at least until the winning terminal set has completed its page.

At terminal set 100-3, assuming that the set 100-3 is deemed to be "winning" terminal set at 1080, or alternatively assuming that no objections are received from any other terminal set within a specified timeout period at 1076, the terminal set 100-3 may then begin sending page content (1082). The user of terminal set 100-3 may initially be notified, e.g. by way of a tone or a prompt on a user interface, that the page has been successfully initiated. This advises the user to begin speaking into the handset or otherwise provide page content. In the case of voice paging, the user's speech may be captured by the handset of the initiating terminal set and sent in the form of audio messages to switch 20. The switch 20 may forward the content to only the terminal sets in the paged zone using multicasting (described below). Each terminal set 100-1, 100-2 in paging zone 1 receives the page content (e.g. audio messages) and converts it to an appropriate format (e.g. audio signals) and played (e.g. over a speaker 111) or displayed appropriately.

In the present embodiment, multicasting is used to limit the recipients of a page to only the terminal sets in the desired paging zone(s). As is well-known by those skilled in the art, "multicasting" refers to the transmission of a single message to multiple recipients, which may be a subset of the total number of potential recipients on a network. When the same message is to be sent to a group of recipients, multicasting may be more efficient that broadcasting (in which case all network devices, even those to whom the message is not intended, receive the message) and unicasting (point-to-point transmissions between two network devices, which is repeated once per intended recipient). In essence, each terminal set in a group of sets registers with switch 20 to receive copies of any messages falling within a range of addresses. When the switch receives a message falling within that range, it will forward copies of the message to each terminal sets which has registered to receive copies of the message. In the case of VoIP terminal sets, the multicasting may be IP multicasting as described in RFC 1112 entitled "Host extensions for IP Multicasting", which will be familiar to those skilled in the art. Multicasting is not a requirement however.

While page content (e.g. audio messages) is being transmitted to each terminal set 100-1, 100-2 in the desired paging zone 1 (or all zones if that had been specified), the initiating terminal set 100-3 continues to periodically send a PEER_ASSERT message in which its continued claim to the paging zone(s) is asserted. In this manner, any terminal sets which happen to join the network during the page will be made aware that a page is ongoing. These periodic PEER_ASSERT messages may be transmitted using a different multicast address that that used by the audio messages. Because audio messages are likely to be sent fairly frequently, the amount of message traffic associated with the audio message multicast address is likely to be high. If the periodic PEER_ASSERT messages were to be sent using the same address, the likelihood of dropping these messages (e.g. due to a buffer overflow at a terminal set) may be unacceptably high.

Upon completion of the page, the initiating terminal set transmits several copies of a PEER_ASSERT message to all other terminal sets in the system in which it indicates that it has relinquished its claim to the relevant paging zone(s) (1084, FIG. 10). Again, several copies of the message are sent in rapid succession in order to increase the likelihood of receipt of the message. This PEER_ASSERT message also serves to notify each receiving terminal set (1178, FIG. 1) in paging zone 1 that it no longer needs to listen for incoming page content. This concludes the overview of paging operation of FIGS. 10 and 11.

If one or more terminal sets in a desired paging zone is/are already engaged in a call when the page is initiated, this will not preclude the initiating terminal set from initiating the page. The terminal set(s) engaged in a call will simply not play the portion of the page that is received while the call is ongoing. Upon completion of the call, the freed terminal set will play whatever portion of the page remains, e.g., over its speaker.

While a page is taking place, if a user of the recipient terminal set needs to use the terminal set, e.g., to receive an incoming call or to place a call, playing of the page on the speaker of the recipient terminal set is ceased until the call is completed.

It will be appreciated that paging functionality may thus be provided without the use of central equipment.

In some embodiments, pages may include not just audio but graphical or video information. In this case, a display at each terminal sets receiving a page may display a graphic or may be refreshed repeatedly to display video content.

In some embodiments of the invention, the terminal set from which the page is initiated looks up in a database the terminal sets which are to receive the page and sends the message to the terminal sets that are to receive the page. In some embodiments of the invention, the database corresponds to the routing table 200 of FIG. 5. For purposes of allowing all terminal sets to maintain updated information, the message may also be sent to other terminal sets.

Figure 12:
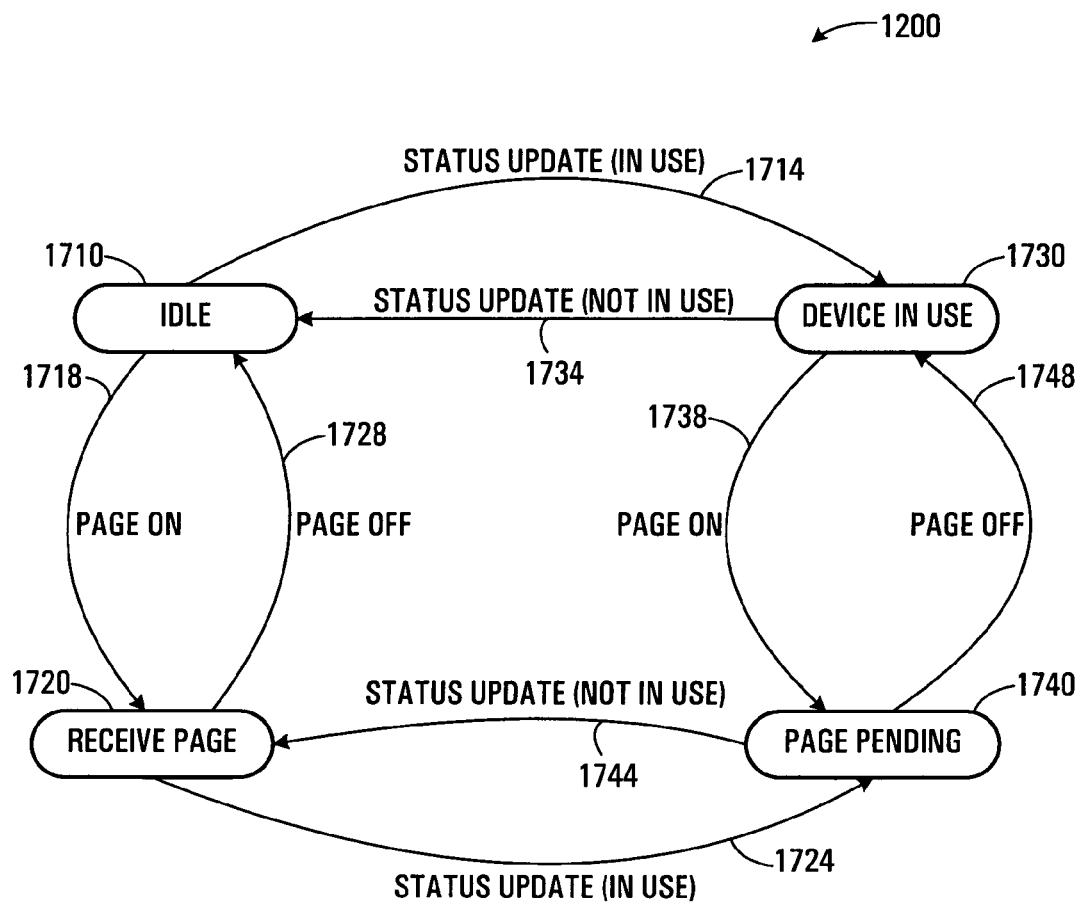
FIG. 12 is a state machine for receiving a page implemented by each terminal set of FIG. 1.

FIG. 12 illustrates a Receive Page Finite State Machine (RxPageFSM) 1200 implemented by an exemplary terminal set 100-X of FIG. 1 (where X=1 to 4) during the receipt of a page according to an embodiment of the invention. As shown in FIG. 12, RxPageFSM 1200 includes four states: 1) an idle state 1710 in which the terminal set waits for a call or initialization of a page; 2) a receive page state 1720 in which the terminal set 100-X is receiving a page, e.g., in the form of audio (and/or video) messages and is decoding the messages in order to play the page; 3) a page pending state 1740 in which a page has been requested by another terminal set but terminal set 100-X engaged in a call; and 4) a device in use state 1730 in which the terminal set is engaged in a call and there is no paging requested. With reference to FIG. 3, while in any one of the four states, the paging module 160 receives messages from the input handler 150, the call processing module 70 and the peer discovery module 110, and directs any paging content to one or more of audio handler 140 and display handler 130, as necessary, for playing on a speaker 111 or display 112.

In the steady state (when terminal set is not engaged in a call or receiving a page), the terminal set 100-X is in the idle state 1710. In this state, the terminal set 100-X essentially waits for a remote network device to initiate a page or for a call be initiated. Upon initiation of a page, of which the terminal set 100-X will be apprised by receipt of several PEER_ASSERT messages with an asserted claim to a paging zone from a remote network device, the paging module 160 receives a PageOn message 1718 from the peer discovery module 110 (specifically, from the Peer Resource Manager module 1406, described below) and the terminal set enters the receive page state 1720 in which the paging module 160 directs any media data associated with the page to any one or more of the audio handler 140 and the display handler 130 for output. While in the page state 1720, the terminal set 100-X may receive a call, in which case the call processing module 70 generates a StatusUpdate (InUse) message 724 that is received by the paging module 160. The paging module 160 releases paging resources associated with the page (e.g. the claim of ownership of the multicast address and port associated with that paging zone) and enters the page pending 1740 state (in which receipt of the page is ceased) to allow the call to be processed. Once the call is completed, the call processing module 70 generates a StatusUpdate (NotInUse) message 1744 that is sent to the paging module 160. The paging resources associated with the page are then reset and the terminal set enters the receive page state 1720 in which the paging module 160 once again directs media data associated with the page to any one or more of the audio handler 140 and the display handler 130 for output. In the receive page state 1720, when the remote terminal set terminates the page (i.e. deasserts its claim to the desired paging zone) with the use of a PEER_ASSERT message, the peer discovery module send a PageOff message 1728 to the paging module 160. The paging resources for the page are then disabled, the audio handler 140 and the display handler 130 are released, and the terminal set 100-X returns to the idle state 1710.

While in the idle state 1710, when a call is received the call processing module 70 sends a StatusUpdate (InUse) message 1714 to the paging module 160 indicating that the terminal set 100-X is in use. The terminal set then enters the device in use state 1730. While in the device in use state 1730, if a remote device requests paging, the peer discovery module 110 sends a PageOn message 1738 to the paging module 160 and the terminal set enters the page pending state 1740 in which any paging request is put on hold, and no page is received, while the call is being processed. In the page pending state 1740, the terminal set waits for either the StatusUpdate (NotInUse) message 1744 from the call processing module 70 indicating that the call is no longer being processed or a PageOff message 1748 from the peer discovery module 110 indicating that the remote network device has relinquished its claim to the paging zone of which terminal set 100-X is a member. In the pending page state 1740, upon receipt of the PageOff message 1748, the terminal set enters the device in use state 1730. In the device in use state 1730, when the call is completed the call processing module 70 sends a StatusUpdate (NotInUse) message 1734 to the paging module 160 and the terminal set 100-X return to the idle state 1710.

Figure 13:
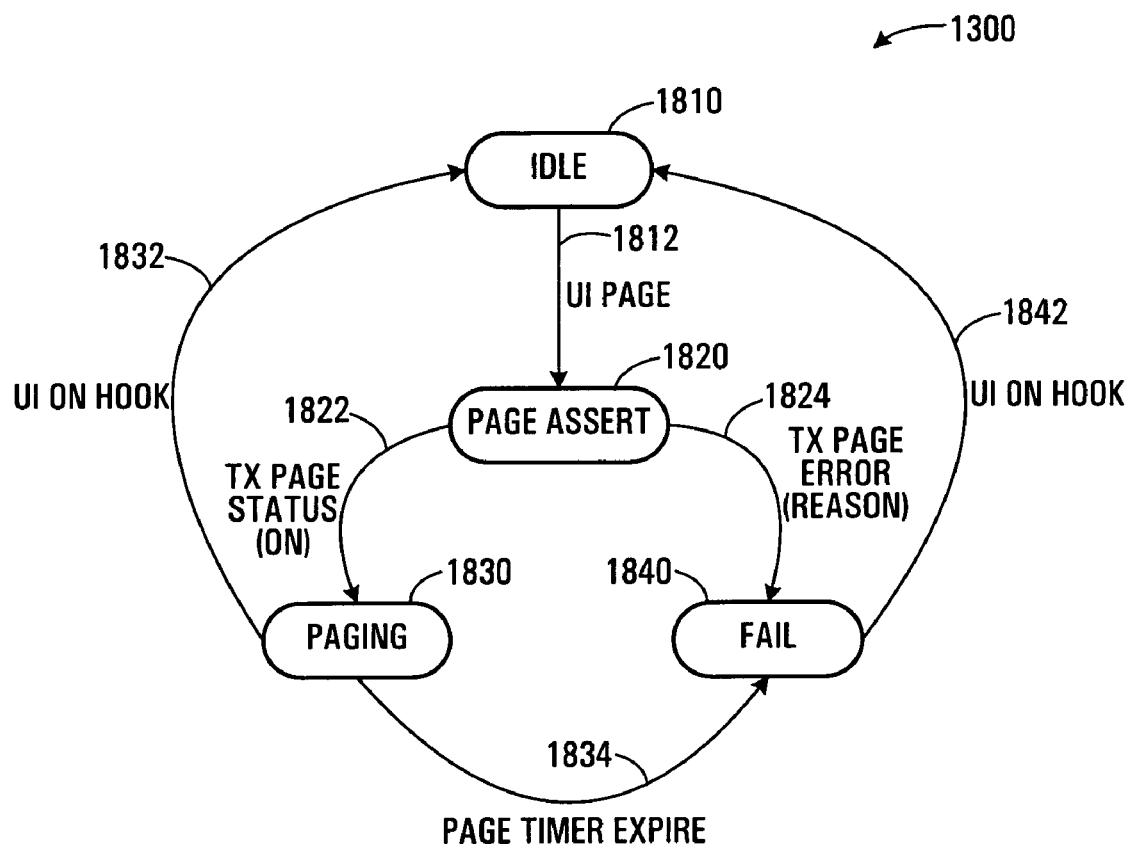
FIG. 13 is a state machine for sending a page implemented by each terminal set of FIG. 1.

FIG. 13 illustrates a Transmit Page Finite State Machine (TxPageFSM) 1300 implemented by an exemplary terminal set 100-X during the transmission of a page according to an embodiment of the invention. TxPageFSM 1300 includes four states: 1) an idle state 1810; 2) a page assert state 1820 in which paging is being requested (or, more specifically, in which several PEER_ASSERT messages have been sent to other terminal sets indicating a desire to send a page and no objections have yet been received and a timer has not yet expired); 3) a paging state 1830 in which a desired paging zone has been exclusively claimed and a page is being transmitted to that zone; and 4) a fail state 1840 in which a paging request has failed.

In the steady state, the terminal set 100-X is in the idle state 1810. When a user initiates a page through the input handler 150 for example, the input handler 150 sends a (UIPage) User Interface Page message 1812 to the paging module 160 with the UIPage message 1812 identifying a paging zone requested by the user. The terminal set 100-X then enters the page assert state 1820 in which the paging module 160 will send several PEER_ASSERT messages asserting its claim to the paging zone identified by the user. In particular, the paging module 160 has a page manager 1404 (described below) responsible for reserving the resources for paging, and in the page assert state 1820, if the requested resource is successfully reserved the page manager 1404 generates a TXPageStatus (ON) message 1822 within the paging module 160 and the terminal set transitions to the paging state 1830. In the page assert state 1820, if the resource being requested is not available the page manager 1404 generates a TXPageError message 1824 within the paging module 160 and the terminal set transitions to the fail state 1840. While in the paging state 1830 the media data associated with the page is multicast for example onto a pre-defined multicast IP address until a page timer expires a message 1834 is generated or until the user terminates the page and a UIOnHook (User Interface On Hook) message 1832 is generated by the input handler 140. In the paging state 1830, if the page timer expires, the terminal set transitions to the fail state 1840 and the user is notified of the expiry of the timer by displaying a message or outputting a voice message for example. The page timer is used to limit the duration of the page. It is intended to protect against the scenario in which a user leaves their phone off-hook while paging. This timer may take a comparatively long time (e.g. 2 minutes) to expire. It is noted that the failed state could also be reached if the conflict resolution mechanism deems the current terminal set the 'loser' such that the current set does not gain control of the paging resources. When the user acknowledges the failed condition by for example releasing a key, the input handler 150 sends a UIOnHook message 1842 to the paging module 160. When any one of the UIOnHook messages 1832, 1842 is received the terminal set releases any resources reserved for paging and then transitions to the idle state 1810.

Figure 14:
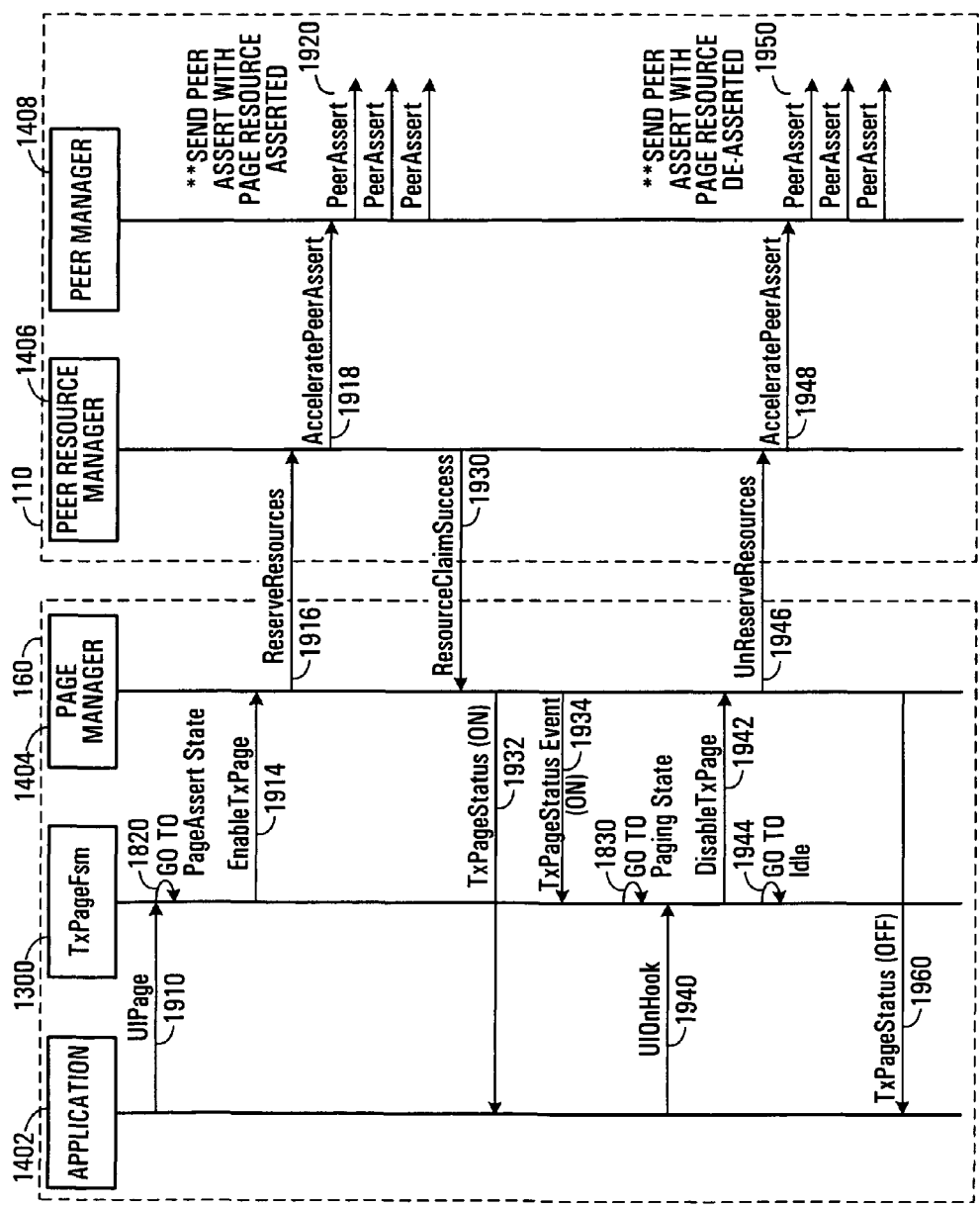
FIG. 14 is a sequence diagram illustrating communication between various software modules during transmission of a page by a terminal set of FIG. 1.

FIG. 14 is a sequence diagram illustrating the transmission of a page by an exemplary terminal set 100-X. FIG. 14 illustrates communications between various modules comprising the peer discovery module 110 and paging module 160 (FIG. 3), including an application 1402, a Transmit Page Finite State Machine 1300 (described above), a Page Manager 1404, a Peer Resource Manager 1406, and a Peer Manager 1408.

Paging application 1402 is a software module that is responsible for collecting user stimulus (e.g. on-hook, off-hook, and 'page' button presses) and relaying them to the paging state machines 1200 (FIG. 12) and 1300 (FIG. 13). Similarly, the application controls the delivery of visual (e.g. status display) and audio (e.g. paging audio) to the user.

Page Manager 1404 is responsible for keeping track of any pages which are presently ongoing in the network 30 (FIG. 1), regardless of whether or not the pages are being sent to a paging zone of which the terminal set 100-X is a member. Page manager 1404 achieves this goal by receiving information contained in recently received PEER_ASSERT messages from Peer Resource Manager 1406 (described below). This is a result of registration by the Page Manager 1404 with Peer Resource Manager 1406 for notification of any paging-related events. Using its knowledge of the current state of paging in the network (which, e.g., may take the form of the "amalgam" of FIG. 9C), Page Manager 1404 either approves or denies requests from the TxPageFSM 1300 to initiate a page for a specified paging zone depending upon whether the desired page would conflict with an ongoing page. If a request is approved, Page Manager 1404 is also responsible for interacting with the Peer Resource Manager 1406 to claim the desired paging zone. Page Manager 1404 supplies the content of the paging field 292 (FIG. 4) for outgoing PEER_ASSERT messages.

The Peer Resource Manager module 1406 is responsible for monitoring the paging field 292 (FIG. 4) of incoming PEER_ASSERT messages. In the event that any change is detected in the value of the paging field 292 from the most recent transmission from the terminal set which sent the received PEER_ASSERT message, the Peer Resource Manager 1406 notifies the Page Manager 1404 of the change.

Peer Manager 1408 is responsible for receiving PEER_ASSERT messages from all other terminal sets and for breaking down the various fields within each PEER_ASSERT message for processing by various software modules. In the context of paging, the paging field 292 of each PEER_ASSERT message is the primary field of interest; however, the Peer Manager 1408 is also responsible for extracting other fields from the message for other purposes. Peer Manager 1408 is also responsible for compiling information for inclusion in various fields in outgoing PEER_ASSERT messages, including the paging field 292 (FIG. 4), and for sending the outgoing PEER_ASSERT messages to apprise other terminal sets of the status of the current terminal set 100-X. As will be appreciated, Peer Manager 1408 may be instructed to send multiple PEER_ASSERT messages in rapid succession, in contrast to its usual transmission of a PEER_ASSERT message of every two seconds in an exemplary embodiment.

It should be appreciated that the Peer Resource Manager module 1406 and the Peer Manager module 1408 are both components of the peer discovery module 110 (not of paging module 160).

In FIG. 14, when a user at the terminal set initiates paging, the paging application 1402 executed by the paging module 160 sends a User Interface Page (UIPage) message 1910 to the TxPageFsm 1300 indicating to the TxPageFsm 1300 to transition to the page assert state 1820 (FIG. 13). The TxPageFsm 1300 sends an enable Transmit Page (enableTxPage) message 1914 to the Page Manager 1404. This message instructs the Page Manager 1404 to examine whether paging in the desired zone is possible (i.e. whether the desired paging would conflict with any ongoing paging), and if paging is possible, to take steps for the current terminal set 100-X to claim the desired paging zone. The page manager 1404 sends a request 1916 to the peer resource manager 1406 to reserve the desired paging zone. The peer resource manager 1406 sends a request 1918 to the peer manager 1408 to shorten an interval of time at which the next several (e.g. three) PEER_ASSERT messages are sent. The peer manager 1408 then sends three PEER_ASSERT messages 1920 with the shortened interval of time between messages (see 1074 of FIG. 10).

In some embodiments of the invention, when paging is not being requested the PEER_ASSERT messages 1920 are sent at an interval of time of 2 seconds for example and during the paging request the interval of time between the PEER_ASSERT messages 1920 is between 50 ms to 500 ms. In other embodiments of the invention, when paging is not being requested the PEER_ASSERT messages 1920 are sent at an interval of time between 1 and 5 seconds.

If the requested paging zone is already receiving a page, the peer resource manager 1406 returns with an error code to the page manager 1404 (not shown) which in turn generates a TXPageError message (not shown) for the TXPageFsm 1300, indicating no page will be possible. Where several PEER_ASSERT messages 1920 are sent and no objection is received within a timeout interval, the peer resource manager 1406 returns a ResourceClaimSuccess message 1930 to the page manager 1404 indicating that the page request is successful. The page manager 1404 responds with a TxPageStatus (ON) message 1932 to the application 1402. The message 1932 contains information for that is used by application 1402 to indicate to the user of the current terminal set 100-X, by way of one or more of the audio handler 140 and the display handler 130, that the page request was successful and to notify the user, e.g., to begin speaking into the handset of the set 100-X. The page manager 1404 then sends a TxPageStatus (ON) message 1934 to the TxPageFsm 1300 and the TxPageFsm 1300 transitions to the paging state 1830.

When the user completes making the page (e.g. is finished speaking), the page is terminated for example by placing the handset used for making the page on-hook. This action results in a User Interface On Hook (UIOnHook) message 1940 being sent from the application 1402 to the TxPageFsm 1300. In response to receiving the UIOnHook message 1940, the TxPageFsm 1300 sends a Disable Transmit Page (disableTxPage) message 1942 to the page manager 1404 and the TxPageFsm 1300 enters an idle state 1944. The page manager 1404 sends a message 1946 instructing the peer resource manager 1406 to release the paging resources (i.e. to relinquish the exclusive claim to the paging zone). In response, the peer resource manager 1406 updates the paging resources accordingly and sends a request 1948 to the peer manager 1408 to send three PEER_ASSERT messages 1950 to all other terminal set at shortened intervals indicating that the current terminal set 100-X has relinquished its claim to the relevant paging zone (see 1084 of FIG. 10). After sending message 1946, the page manager 1404 sends a TxPageStatus (OFF) message 1960 to the application 1402 to update a display for the user indicating that paging is now completed.

Figure 15:
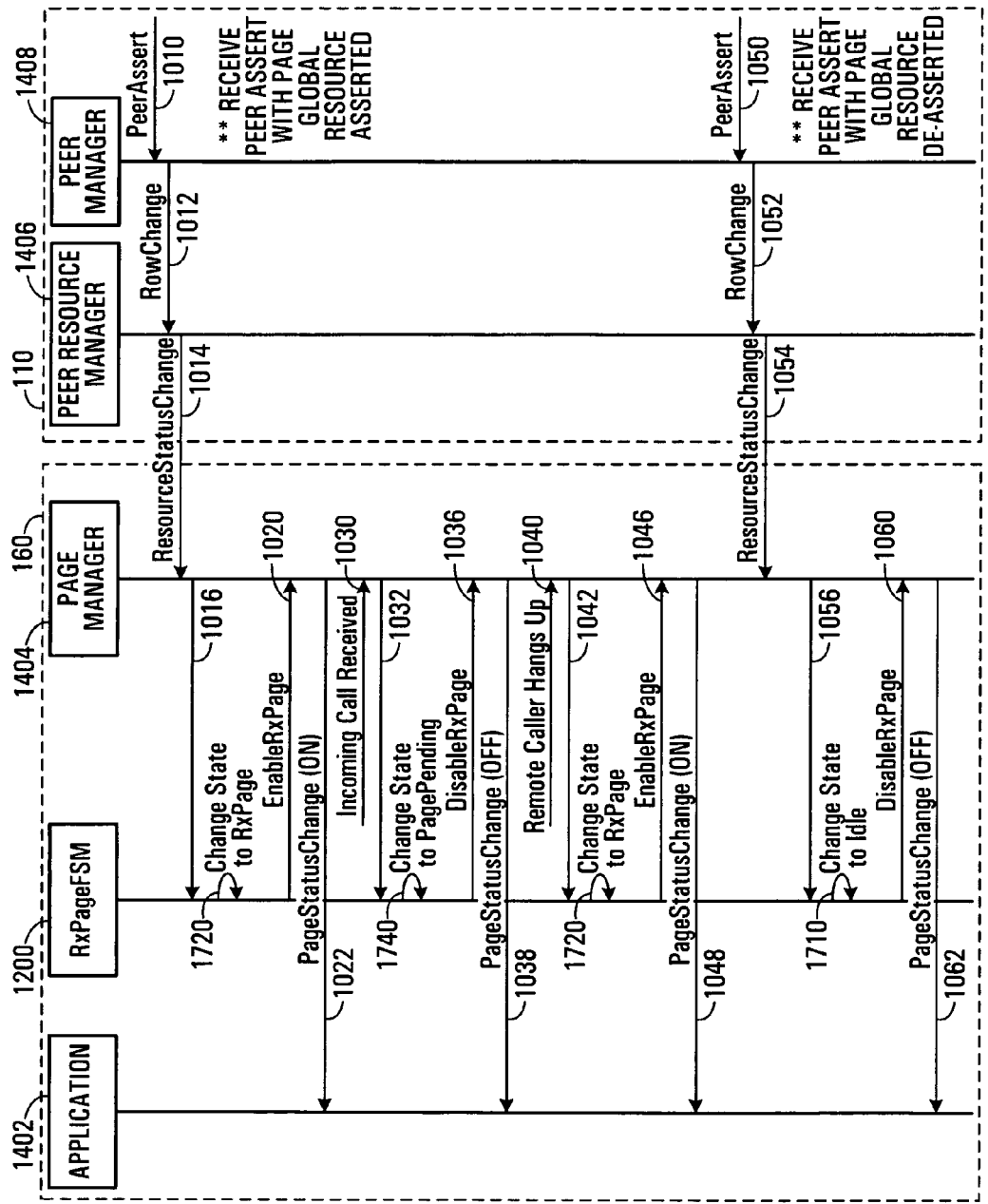
FIG. 15 is a sequence diagram illustrating communication between various software modules during reception of a page by a terminal set of FIG. 1.

FIG. 15 is a sequence diagram illustrating the receipt of a page by a terminal set 100-X. FIG. 15 illustrates communications between various modules comprising peer discovery module 110 and paging module 160 (FIG. 3), namely application 1402, Page Manager 1404, Peer Resource Manager 1406, and Peer Manager 1408, and Receive Page Finite State Machine 1200 (all of which are described above).

Initially, a request to initiate a page from a remote terminal set is received by the peer manager 1408 in the form of several PEER_ASSERT messages 1010 with an asserted paging zone (see 1170 of FIG. 11). Assuming this assertion is new from the remote terminal set, the peer manager 1408 sends a RowChange message 1012 to the peer manager 1408 with the message 1012 indicating what aspect of the remote terminal set's status has changed. The peer resource manager 1406 forwards paging-specific status information in a message 1014 to the page manager 1404. Assuming that the current terminal set 100-X is a member of the indicated paging zone, the page manager 1404 sends a PageOn message 1016 to the RxPageFsm 1200 indicating that a page may be expected. The RxPageFsm 1200 transitions to the receive page state 1720 and instructs the page manager 1404 with a message 1020 to enable paging (see 1174 of FIG. 11). The page manager 1404 then instructs the application by way of a message 1022 that the user is to be updated with information (e.g. by way of a tone played on speaker 111 or an icon displayed on display 112) indicating a page is to be received.

Assuming an incoming call is received at this stage, the page manager 1404 is informed of this fact by way of a message 1030 from the call processing module 70 and sends an InUse message 1032 to the RxPageFsm 1200 indicating there is an incoming call. The RxPageFsm 1200 changes state to the page pending state 1740 and sends a disableRxPage message 1036 to the page manager 1404 indicating that the RxPageFsm 1200 is in the page pending state 1034, such that a page cannot be received. The page manager 1404 then sends a status change message 1038 containing information indicating that paging is pending completion of the call to the application for display to the user.

When the incoming call is terminated, the page manager 1404 is informed of this fact by the call processing module 70 with a message 1040 and sends NotInUse message 1042 to the RxPageFsm 1200 indicating that the call is has been completed. The RxPageFsm 1200 changes state to the receive page state 1720 and sends an enableRxPage message 1046 to the page manager 1404 indicating a change of state to the receive page state 1720, in which a page may now be received. The page manager 1404 then sends a statusChange (Off) message 1048 containing information indicating that paging is no longer pending completion of a call to the application for display to the user.

During paging, PEER_ASSERT messages are periodically received from the remote network device and processed. When a PEER_ASSERT message 1050 from the remote network device is received by the peer manager 1408 and contains changes in status information from a previous PEER_ASSERT message sent by the remote network device (e.g. indicating that the claim to the paging zone has been released—see 1178 of FIG. 11), the peer manager 1408 sends a RowChange message 1052 to the peer resource manager 1406 and the peer resource manager 1406 informs the page manager 1404 of the status changes by sending a ResourceStatusChange message 1054 to the page manager 1404. The page manager 1404 sends a message 1056 to the RxPageFsm indicating that the remote terminal set has relinquished its exclusive claim to the paging zone. The RxPageFsm changes its state to the idle 1710 and sends a disableRxPage message 1060 to the page manager 1404 to reflect same. The page manager 1404 then sends a statusChange (Off) message 1062 to the application for updating the user displayed information indicating the page is at an end.

As will be appreciated by those skilled in the art, modifications to the above-described embodiment can be made without departing from the essence of the invention. For example, although the described embodiment largely refers to terminal sets, it will be appreciated that the described methods are equally applicable to other forms of network devices, such as switches or routers for example. As well, network devices may be interconnected by any form of network, not just a LAN. Further, although the peer discovery description refers to the selection, probing and assertion of directory numbers, it will be appreciated that the described methods are equally applicable to network addresses other than directory numbers.

The invention is not limited to embodiments in which paging is implemented in the context of peer discovery and in other embodiments of the invention, any functionality provided by the peer resource manager 1406 and the peer manager 1408 of the peer discovery module 110 for purposes of paging is implemented for example in the paging module 160. Furthermore, in some embodiments paging functionality is provided by one or more modules.

It should also be appreciated that some embodiments of the invention may use different mechanisms for asserting and deasserting claims to a paging zone than that described above. For example, some embodiments may use a paging field that is larger than eight bits to permit more than eight paging zones to be represented. Other embodiments may employ a wholly different scheme in which a single bit of the 8-bit paging field is deemed to be an "assert claim to paging zone" bit (e.g. when its value is 1) or a "deassert claim to paging zone" bit (e.g. when its value is 0) and in which the remaining bits are used to specify the zone to which a claim is being asserted or deasserted. Assuming that one bit pattern is reserved to represent "all zones", the remaining seven bits could be used to specify 127 different paging zones ($2^7-1$) using this method.

It should be appreciated that, in some embodiments of the invention, paging is not implemented in the context of peer discovery. For example, the functionality provided by certain modules of the peer discovery module 110 in the above-described embodiment, such as peer resource manager 1406 and peer manager 1408, may be incorporated into the paging module 160.

Numerous modifications and variations of the present invention are possible in light of the above teachings. It is therefore to be understood that within the scope of the appended claims, the invention may be practiced otherwise than as specifically described herein.

What is claimed is:

1. At a network device, a method comprising: receiving at least one indication of a page to be sent to a set of recipient network devices including a plurality of network devices, said at least one indication indicating said set of recipient network devices; ascertaining whether said network device is within said set of recipient network devices; and based at least upon said ascertaining, determining whether to receive said page, and further comprising: detecting a desire to send an outgoing page from said network device to a set of target network devices including one or more network devices, notifying other network devices including said target network devices that said outgoing page is to be sent; and waiting for any objections from any of said other network devices to the sending of said outgoing page, wherein an objection comprises a notification that another network devices wishes to send a page to said set of target network devices, wherein said network device and said recipient network device comprise terminal sets.

2. The method of claim 1 wherein said indicating said set of recipient network devices comprises indicating a paging zone which includes said recipient network devices and wherein said ascertaining comprises determining whether said network device is included in said paging zone.

3. The method of claim 1 wherein said determining whether to receive said page is conditional upon determining that said network device is not currently engaged in a call.

4. The method of claim 1 further comprising, if said ascertaining ascertains said network device to be within said set of recipient network devices, receiving said page.

5. The method of claim 4 further comprising, if said network device becomes engaged in a call, ceasing said receiving of said page.

6. The method of claim 4 wherein said receiving said page comprises receiving multicast messages containing page content.

7. The method of claim 6 wherein said page content comprises at least one of audio, video and data.

8. The method of claim 1 wherein said set of network devices target comprises a paging zone.

9. The method of claim 1 wherein, if said at least one indication of a page indicates that said target network devices are currently unable to receive a page, said determining determines not to send the outgoing page.

10. The method of claim 1 wherein, if said at least one indication of a page indicates that said target network devices are currently able to receive a page, said determining determines to send the outgoing page, and further comprising sending the outgoing page.

11. The method of claim 1, further comprising, upon receipt of an objection from any of said other network devices to the sending of said outgoing page, applying a conflict resolution scheme to determine which of said network device and said objecting network device shall be permitted to send a page.

12. The method of claim 11 wherein said applying a conflict resolution scheme comprises comparing a unique identifier of said network device to a unique identifier of said objecting network device.

13. The method of claim 12 wherein said unique identifier is a hardware address.

14. The method of claim 1, wherein said sending the outgoing page further comprises: in the absence of any objections, sending the outgoing page to the target network devices.

15. The method of claim 14 wherein said sending the outgoing page to the target network devices comprises multicasting content of said outgoing page to said target network devices.

16. The method of claim 14 further comprising, upon completing said sending of said outgoing page to the target network devices, notifying other network devices including said target network devices that said sending of the outgoing page is complete.

17. The method of claim 1, wherein said network device and said recipient network devices comprise VoIP terminal sets.

18. At a network device, a method comprising: receiving at least one indication of a page to be sent to a set of recipient network devices including a plurality of network devices, said at least one indication indicating said set of recipient network devices; ascertaining whether said network device is within said set of recipient network devices; and based at least upon said ascertaining, determining whether to receive said page, wherein said network device and said recipient network device comprise terminal sets, wherein said receiving at least one indication of a page to be sent comprises receiving multiple indications, each of said multiple indications indicating a different page to be sent to a subset of said recipient network devices.

19. A network device adapted to: receive at least one indication of a page to be sent to a set of recipient network devices including a plurality of network devices, said at least one indication indicating said set of recipient network devices; ascertain whether said network device is within said set of recipient network devices; and based at least upon said ascertaining, determine whether to receive said page, and further adapted to: detect a desire to send an outgoing page from said network device to a set of target network devices including one or more network devices; and based on said at least one indication of a page, sending the outgoing page, wherein said sending the outgoing page comprises: notifying other network devices including said target network devices that said outgoing page is to be sent; and waiting for any objections from any of said other network devices to the sending of said outgoing page, wherein an objection comprises a notification that another network devices wishes to send a page to said set of target network devices, wherein said network device and said recipient network devices comprise terminal sets.

20. The network device of claim 19 wherein said indicating said set of recipient network devices comprises indicating a paging zone which includes said recipient network devices and wherein said ascertaining comprises determining whether said network device is included in said paging zone.

21. The network device of claim 19 wherein said determining whether to receive said page is conditional upon determining that said network device is not currently engaged in a call.

22. The network device of claim 19 further adapted to, if said ascertaining ascertains said network device to be within said set of recipient network devices, receive said page.

23. The network device of claim 22 further adapted to, if said network device becomes engaged in a call, cease receiving said page.

24. The network device of claim 22 wherein said receiving said page comprises receiving multicast messages containing page content.

25. The network device of claim 24 wherein said page content comprises at least one of audio, video and data.

26. The network device of claim 19 wherein said set of network devices target comprises a paging zone.

27. The network device of claim 19 wherein, if said at least one indication of a page indicates that said target network devices are currently unable to receive a page, said determining determines not to send the outgoing page.

28. The network device of claim 19 wherein, if said at least one indication of a page indicates that said target network devices are currently able to receive a page, said determining determines to send the outgoing page, said network device being further adapted to send the outgoing page.

29. The network device of claim 19, further adapted to, upon receipt of an objection from any of said other network devices to the sending of said outgoing page, apply a conflict resolution scheme to determine which of said network device and said objecting network device shall be permitted to send a page.

30. The network device of claim 29 wherein said applying a conflict resolution scheme comprises comparing a unique identifier of said network device to a unique identifier of said objecting network device.

31. The network device of claim 30 wherein said unique identifier is a hardware address.

32. The network device of claim 19, wherein said sending the outgoing page further comprises: in the absence of any objections, sending the outgoing page to the target network devices.

33. The network device of claim 32 wherein said sending the outgoing page to the target network devices comprises multicasting content of said outgoing page to said target network devices.

34. The network device of claim 32 further adapted to, upon completing said sending of said outgoing page to the target network devices, notify other network devices including said target network devices that said sending of the outgoing page is complete.

35. The network device of claim 19, wherein said network device and said recipient network devices comprise VoIP terminal sets.

36. A network device adapted to: receive at least one indication of a page to be sent to a set of recipient network devices including a plurality of network devices, said at least one indication indicating said set of recipient network devices; ascertain whether said network device is within said set of recipient network devices; and based at least upon said ascertaining, determine whether to receive said page, wherein said network device and said recipient network devices comprise terminal sets, wherein said receiving at least one indication of a page to be sent comprises receiving multiple indications, each of said multiple indications indicating a different page to be sent to a subset of said recipient network devices.

37. A non-transitory machine-readable medium including machine-executable code for execution at a network device, comprising: machine-executable code for receiving at least one indication of a page to be sent to a set of recipient network devices including a plurality of network devices, said at least one indication indicating said set of recipient network devices; machine-executable code for ascertaining whether said network device is within said set of recipient network devices; machine-executable code for, based at least upon said ascertaining, determining whether to receive said page, machine executable code for detecting a desire to send an outgoing page from said network device to a set of target network devices including one or more network devices; and machine executable code for, based on said at least one indication of a page, sending the outgoing page, wherein said sending the outgoing page comprises: notifying other network devices including said target network devices that said outgoing page is to be sent; and waiting for any objections from any of said other network devices to the sending of said outgoing page, wherein an objection comprises a notification that another network devices wishes to send a page to said set of target network devices, wherein said network device and said recipient network devices comprise terminal sets.

38. The machine-readable medium of claim 37 wherein said indicating said set of recipient network devices comprises indicating a paging zone which includes said recipient network devices and wherein said ascertaining comprises determining whether said network device is included in said paging zone.

39. The machine-readable medium of claim 37 wherein said determining whether to receive said page is conditional upon determining that said network device is not currently engaged in a call.

40. The machine-readable medium of claim 37 further comprising machine executable code for, if said ascertaining ascertains said network device to be within said set of recipient network devices, receiving said page.

41. The machine-readable medium of claim 40 further comprising machine executable code for, if said network device becomes engaged in a call, ceasing said receiving of said page.

42. The machine-readable medium of claim 40 wherein said receiving said page comprises receiving multicast messages containing page content.

43. The machine-readable medium of claim 42 wherein said page content comprises at least one of audio, video and data.

44. The machine-readable medium of claim 37 wherein said set of network devices target comprises a paging zone.

45. The machine-readable medium of claim 37, wherein, if said at least one indication of a page indicates that said target network devices are currently unable to receive a page, said determining determines not to send the outgoing page.

46. The machine-readable medium of claim 37, wherein, if said at least one indication of a page indicates that said target network devices are currently able to receive a page, said determining determines to send the outgoing page, and further comprising machine executable code for sending the outgoing page.

47. The machine-readable medium of claim 37, further comprising machine executable code for, upon receipt of an objection from any of said other network devices to the sending of said outgoing page, applying a conflict resolution scheme to determine which of said network device and said objecting network device shall be permitted to send a page.

48. The machine-readable medium of claim 47 wherein said applying a conflict resolution scheme comprises comparing a unique identifier of said network device to a unique identifier of said objecting network device.

49. The machine-readable medium of claim 48 wherein said unique identifier is a hardware address.

50. The machine-readable medium of claim 37, wherein said sending the outgoing page further comprises: in the absence of any objections, sending the outgoing page to the target network devices.

51. The machine-readable medium of claim 50 wherein said sending the outgoing page to the target network devices comprises multicasting content of said outgoing page to said target network devices.

52. The machine-readable medium of claim 50 further comprising machine executable code for, upon completing said sending of said outgoing page to the target network devices, notifying other network devices including said target network devices that said sending of the outgoing page is complete.

53. The machine-readable medium of claim 37, wherein said network device and said recipient network devices comprise VoIP terminal sets.

54. A non-transitory machine-readable medium including machine-executable code for execution at a network device, comprising: machine-executable code for receiving at least one indication of a page to be sent to a set of recipient network devices including a plurality of network devices, said at least one indication indicating said set of recipient network devices; machine-executable code for ascertaining whether said network device is within said set of recipient network devices; and machine-executable code for, based at least upon said ascertaining, determining whether to receive said page, wherein said network device and said recipient network devices comprise terminal sets, wherein said receiving at least one indication of a page to be sent comprises receiving multiple indications, each of said multiple indications indicating a different page to be sent to a subset of said recipient network devices.

55. At a VoIP network device adapted to function as a telephone and having a paging function, the paging function allowing the VoIP network device to receive a page comprising voice data from another VoIP network device and output the voice data without user action and to send a page comprising voice data to one or more other VoIP network devices for output from the one or more other VoIP network devices without user action, a method comprising: receiving at least one indication of a page to be sent to a set of recipient VoIP network devices, said at least one indication indicating said set of recipient VoIP network devices; ascertaining whether said VoIP network device is within said set of recipient VoIP network devices; and based at least upon said ascertaining, determining whether to receive said page, and further comprising: detecting a desire to send an outgoing page from said VoIP network device to a set of target VoIP network devices including one or more VoIP network devices, notifying other VoIP network devices including said target VoIP network devices that said outgoing page is to be sent; and waiting for any objections from any of said other VoIP network devices to the sending of said outgoing page, wherein an objection comprises a notification that another VoIP network devices wishes to send a page to said set of target VoIP network devices.

56. The method of claim 55 further comprising: detecting a desire to send an outgoing page from said VoIP network device; and based on said at least one indication of a page, determining whether to send the outgoing page.

57. The method of claim 55 wherein said one or more other network devices comprise a plurality of other network devices.

58. A VoIP network device having a paging function, the paging function enabling the VoIP network device to send a page to one or more other VoIP network devices, the page comprising voice data to be output from the one or more other VoIP network devices without user action and enabling the VoIP network device to receive a page comprising voice data to be output from the VoIP network device without user action, wherein the VoIP network device is adapted to receive at least one indication of a page to be sent to a set of recipient VoIP network devices including one or more VoIP network devices, said at least one indication indicating said set of recipient VoIP network devices; ascertain whether said VoIP network device is within said set of recipient VoIP network devices; and based at least upon said ascertaining, determine whether to receive said page, and further adapted to: detect a desire to send an outgoing page from said VoIP network device to a set of target VoIP network devices including one or more VoIP network devices; and based on said at least one indication of a page, sending the outgoing page, wherein said sending the outgoing page comprises: notifying other VoIP network devices including said set of target VoIP network devices that said outgoing page is to be sent; and waiting for any objections from any of said other VoIP network devices to the sending of said outgoing page, wherein an objection comprises a notification that another VoIP network devices wishes to send a page to said set of target VoIP network devices.

59. The VoIP network device of claim 58, wherein, said VoIP network device is adapted to detect a desire to send an outgoing page from said VoIP network device; and based on said at least one indication of a page, determining whether to send the outgoing page.

60. The network device of claim 58 wherein said one or more other network devices comprise a plurality of other network devices.

61. A non-transitory machine-readable medium including machine-executable code for execution at a VoIP network device, comprising: machine-executable code for causing the VoIP network device to function as a telephone having a paging function, the paging function allowing the VoIP network device to receive a page comprising voice data from another VoIP network device and output the voice data without user action and to send a page comprising voice data to one or more other VoIP network devices for output from the one or more other VoIP network devices without user action; machine-executable code for receiving at least one indication of a page to be sent to a set of recipient VoIP network devices including one or more VoIP network devices, said at least one indication indicating said set of recipient VoIP network devices; machine-executable code for ascertaining whether said VoIP network device is within said set of recipient VoIP network devices; machine-executable code for, based at least upon said ascertaining, determining whether to receive said page; machine executable code for detecting a desire to send an outgoing page from said VoIP network device to a set of target VoIP network devices including one or more VoIP network devices; and machine executable code for, based on said at least one indication of a page, sending the outgoing page, wherein said sending the outgoing page comprises: notifying other VoIP network devices including said set target VoIP network devices that said outgoing page is to be sent; and waiting for any objections from any of said other VoIP network devices to the sending of said outgoing page, wherein an objection comprises a notification that another VoIP network devices wishes to send a page to said set of target VoIP network devices.

62. The machine-readable medium of claim 61 further comprising: machine executable code for detecting a desire to send an outgoing page from said VoIP network device to a set of target VoIP network devices including one or more VoIP network devices; and machine executable code for, based on said at least one indication of a page, determining whether to send the outgoing page.

63. The machine-readable medium of claim 61 wherein said one or more other network devices comprise a plurality of other network devices.

* * * * *